(12) United States Patent
Ishida et al.

(10) Patent No.: US 12,388,693 B2
(45) Date of Patent: Aug. 12, 2025

(54) DATA CARRIER APPARATUS, COMMUNICATION SYSTEM, AND REPLACEABLE UNIT

(71) Applicant: Canon Kabushiki Kaisha, Tokyo (JP)

(72) Inventors: Tsutomu Ishida, Shizuoka (JP); Kenjiro Hori, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 18/391,818

(22) Filed: Dec. 21, 2023

(65) Prior Publication Data

US 2024/0214251 A1 Jun. 27, 2024

(30) Foreign Application Priority Data

Dec. 26, 2022 (JP) ................................ 2022-208797

(51) Int. Cl.
*H04L 27/233* (2006.01)
(52) U.S. Cl.
CPC ...... *H04L 27/2331* (2013.01); *H04L 27/2337* (2013.01)
(58) Field of Classification Search
CPC .................... H04L 27/2331; H04L 27/2337
See application file for complete search history.

(56) References Cited

U.S. PATENT DOCUMENTS

| 4,497,060 | A | 1/1985 | Yang |
| 5,459,751 | A | 10/1995 | Okamoto |
| 6,064,697 | A | 5/2000 | Yoshikawa |
| 11,101,972 | B2 | 8/2021 | Ittogi et al. |
| 11,743,078 | B2 | 8/2023 | Ittogi et al. |
| 2006/0098691 | A1* | 5/2006 | Yamazaki ............... H03M 5/04 370/518 |
| 2015/0349993 | A1* | 12/2015 | Tyrrell ..................... H04L 23/00 315/294 |
| 2023/0090431 | A1* | 3/2023 | Banin ...................... H04B 1/04 375/295 |

FOREIGN PATENT DOCUMENTS

| JP | S59112747 A | 6/1984 |
| JP | H06216778 A | 8/1994 |
| JP | H09130254 A | 5/1997 |
| JP | 2019103123 A | 6/2019 |

* cited by examiner

*Primary Examiner* — Janice N Tieu
(74) *Attorney, Agent, or Firm* — Venable LLP

(57) ABSTRACT

In a data carrier apparatus, a reception unit receives, from a data carrier driving apparatus, a pulse signal that alternatingly repeats a first-level period and a second-level period, which are set based on individual data values. A measurement unit measures respective time widths of the first-level period and the second-level period in the received pulse signal. A demodulation unit demodulates data conveyed by the received pulse signal, by determining the data value corresponding to the first-level period based on a measured value of the first-level period output from the measurement unit and a first reference value, and determining the data value corresponding to the second-level period based on a measured value of the second-level period output from the measurement unit and a second reference value.

24 Claims, 13 Drawing Sheets

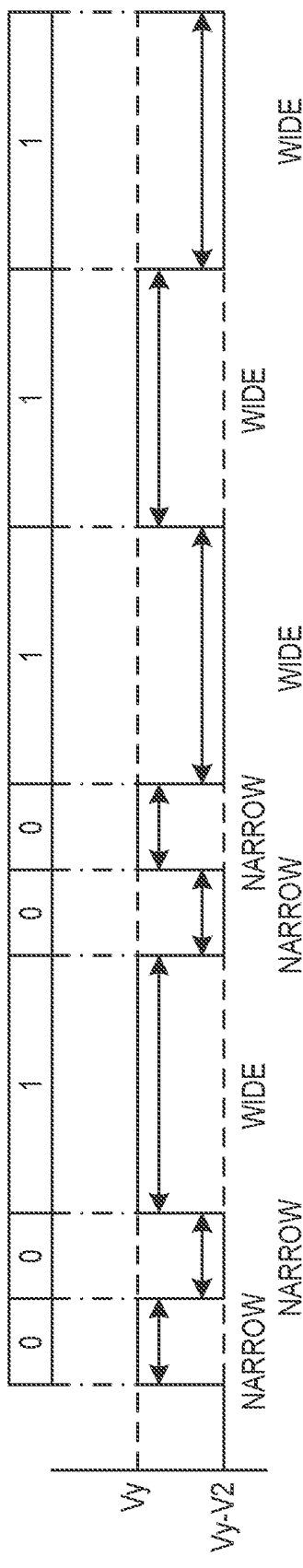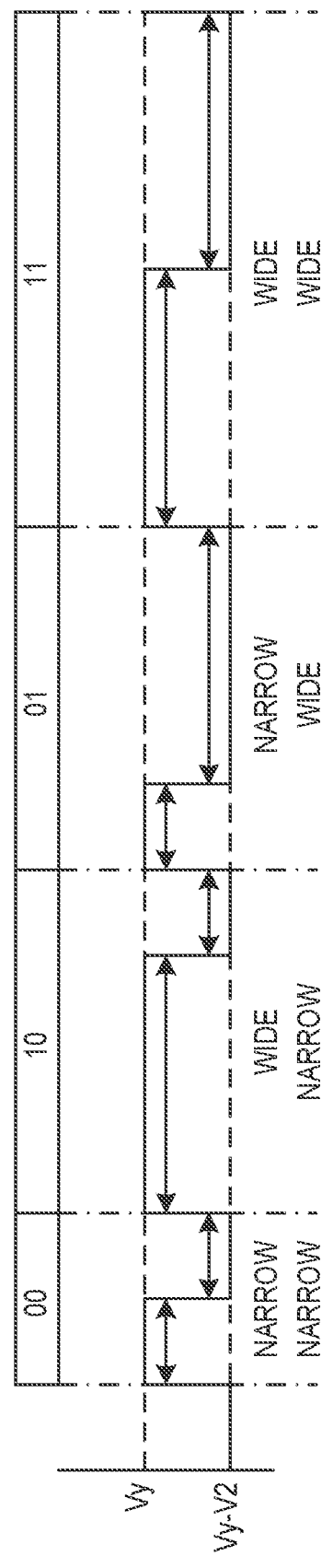

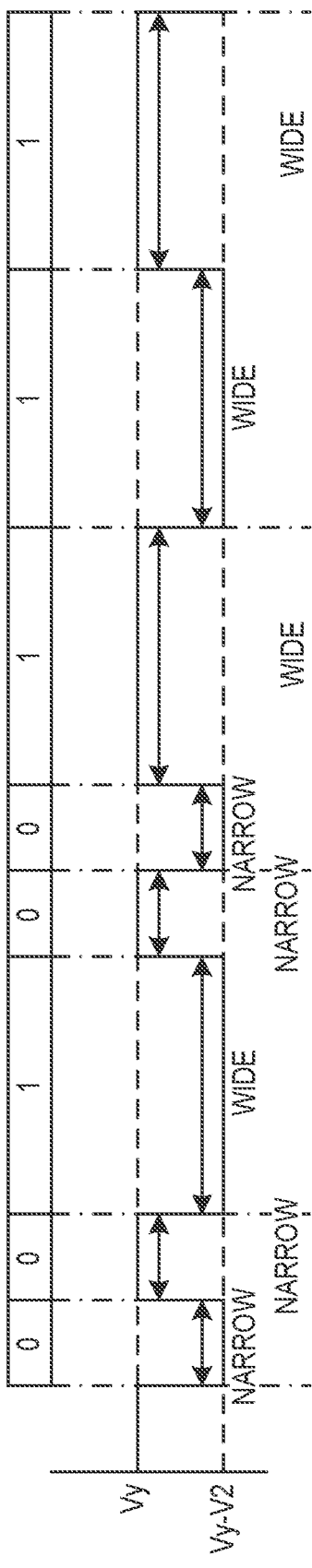
F I G. 5C
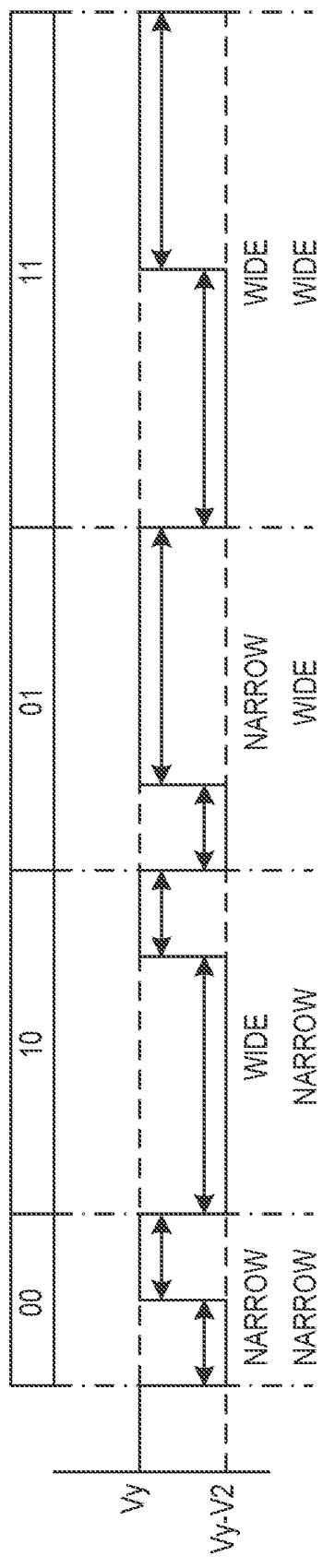
F I G. 5D

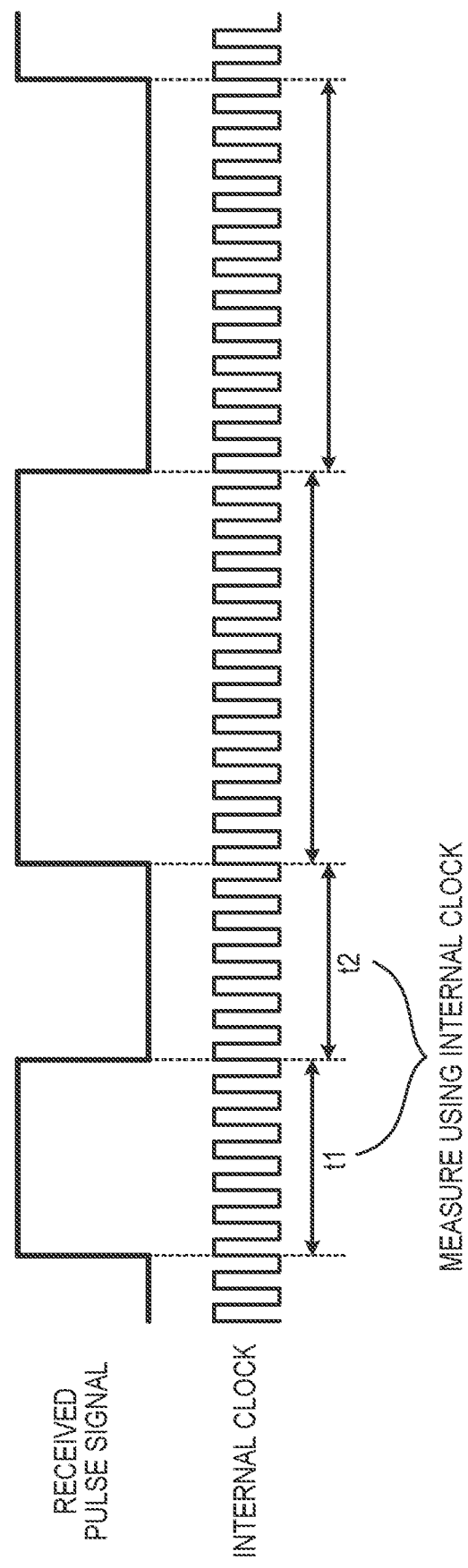

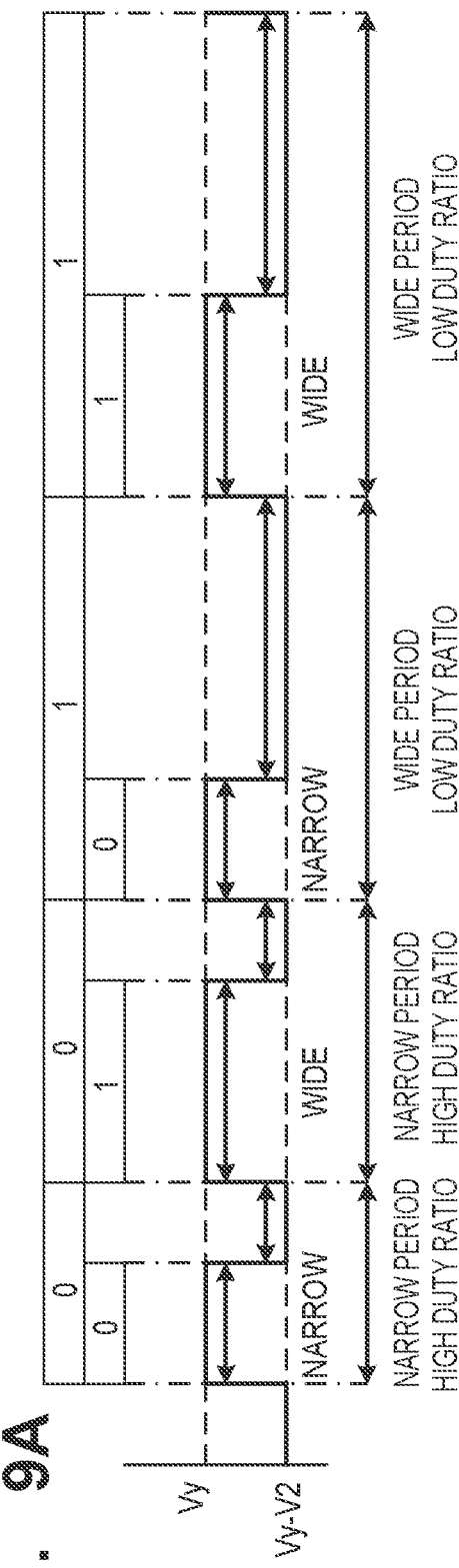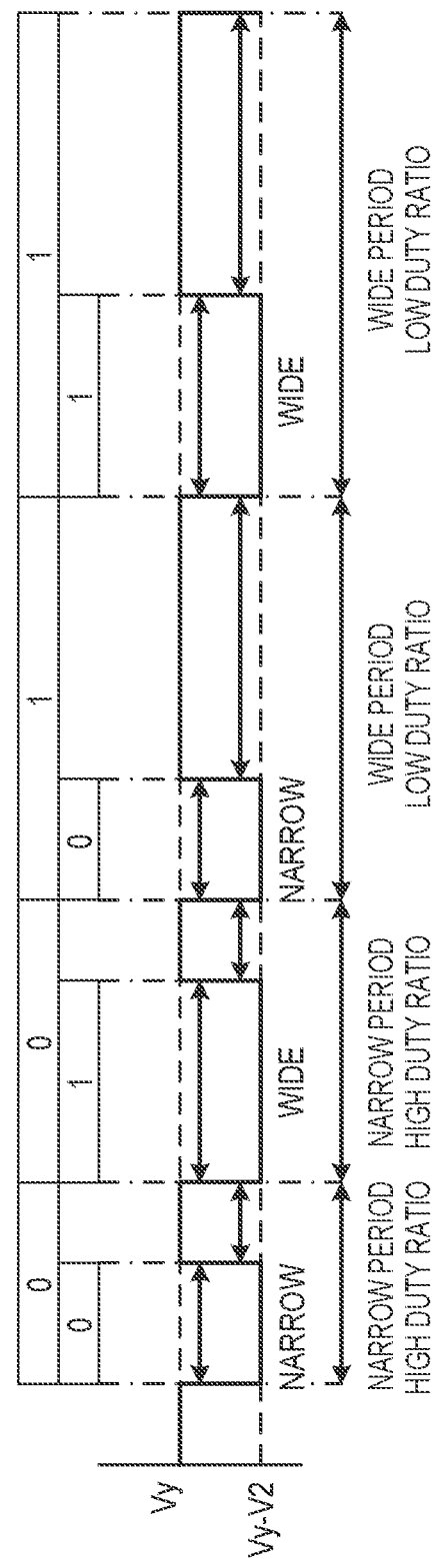

DATA CARRIER APPARATUS, COMMUNICATION SYSTEM, AND REPLACEABLE UNIT

BACKGROUND OF THE INVENTION

Field of the Invention

The present invention relates to a data carrier apparatus, a communication system including a data carrier apparatus and a data carrier driving apparatus, and a replaceable unit, and in particular relates to data communication between a data carrier apparatus and a data carrier driving apparatus.

Description of the Related Art

As a type of two-wire communication interface for communicating between two apparatuses, there is known a two-wire communication interface in which data communication, power supply, and synchronization signal supply are performed using two communication lines (signal lines). Japanese Patent Laid-Open No. 2019-103123 describes a technique for, in a communication system in which communication is performed using two communication lines, increasing the communication rate by transmitting and receiving data through modulation of the frequency of each pulse of a pulse signal in addition to modulation of the duty ratio of each pulse. In such a communication system, data can be transmitted and received in units of 2 bits by modulating the duty ratio and frequency of each pulse of one cycle consisting of a high-level period and a low-level period in a pulse signal.

As described above, by enabling transmission and reception of data in units of 2 bits per cycle of the pulse signal, it is possible to increase the communication rate. However, the minimum unit of data transmission is limited to 2 bits. For this reason, for example, if the number of bits of the data to be transmitted is an odd number, it may be necessary to adjust the data to 2-bit data before transmitting it.

SUMMARY OF THE INVENTION

In view of this, the present disclosure provides a technique that makes it possible to transmit and receive data in units of 1 bit while increasing the communication rate in cases of transmitting and receiving data using a pulse signal.

According to one aspect of the present invention, there is provided a data carrier apparatus capable of communicating with a data carrier driving apparatus, comprising: a reception unit configured to receive, from the data carrier driving apparatus, a pulse signal that alternatingly repeats a first-level period and a second-level period, and in which the first-level period and the second-level period are set based on individual data values; a measurement unit configured to measure respective time widths of the first-level period and the second-level period in the received pulse signal received by the reception unit; and a demodulation unit configured to demodulate data conveyed by the received pulse signal, by determining the data value corresponding to the first-level period based on a measured value of the first-level period output from the measurement unit and a first reference value, and determining the data value corresponding to the second-level period based on a measured value of the second-level period output from the measurement unit and a second reference value.

According to another aspect of the present invention, there is provided a data carrier apparatus capable of communicating with a data carrier driving apparatus, comprising: a reception unit configured to receive, from the data carrier driving apparatus, a pulse signal that alternatingly repeats a first-level period and a second-level period, and in which the first-level period and a cycle of a pulse consisting of the first-level period and the second-level period are set based on individual data values; a measurement unit configured to measure a time width of the first-level period and the cycle of the pulse including the first-level period in the received pulse signal received by the reception unit; and a demodulation unit configured to demodulate data conveyed by the received pulse signal, by determining the data value corresponding to the first-level period based on a measured value of the first-level period output from the measurement unit and a first reference value, and determining the data value corresponding to the cycle based on a measured value of the cycle output from the measurement unit and a second reference value.

According to still another aspect of the present invention, there is provided a replaceable unit that is attachable to an image forming apparatus, comprising: a process member to be used for image formation; and a data carrier apparatus capable of communicating with a data carrier driving apparatus provided in the image forming apparatus, when attached to the image forming apparatus, wherein the data carrier apparatus comprises: a reception unit configured to receive, from the data carrier driving apparatus, a pulse signal that alternatingly repeats a first-level period and a second-level period, and in which the first-level period and the second-level period are set based on individual data values; a measurement unit configured to measure respective time widths of the first-level period and the second-level period in the received pulse signal received by the reception unit; and a demodulation unit configured to demodulate data conveyed by the received pulse signal, by determining the data value corresponding to the first-level period based on a measured value of the first-level period output from the measurement unit and a first reference value, and determining the data value corresponding to the second-level period based on a measured value of the second-level period output from the measurement unit and a second reference value.

According to yet another aspect of the present invention, there is provided a communication system comprising: a data carrier apparatus; and a data carrier driving apparatus to be connected to the data carrier apparatus by two communication lines, wherein the data carrier driving apparatus comprises: a modulation unit configured to generate a pulse signal that alternatingly repeats a first-level period and a second-level period, and that is modulated based on data to be transmitted, the modulation unit being configured to generate the pulse signal in which the first-level period and the second-level period are set based on individual data values; and a transmission unit configured to transmit the pulse signal generated by the modulation unit to the data carrier apparatus based on a potential difference provided between the two communication lines, and the data carrier apparatus comprises: a reception unit configured to receive the pulse signal from the data carrier driving apparatus; a measurement unit configured to measure respective time widths of the first-level period and the second-level period in the received pulse signal received by the reception unit; and a demodulation unit configured to demodulate data conveyed by the received pulse signal, by determining the data value corresponding to the first-level period based on a measured value of the first-level period output from the measurement unit and a first reference value, and determining the data value corresponding to the second-level period based on a measured value of the second-level period output from the measurement unit and a second reference value.

According to still yet another aspect of the present invention, there is provided a communication system comprising: a data carrier apparatus; and a data carrier driving apparatus to be connected to the data carrier apparatus by two communication lines, wherein the data carrier driving apparatus comprises: a modulation unit configured to generate a pulse signal that alternatingly repeats a first-level period and a second-level period, and that is modulated based on data to be transmitted, the modulation unit being configured to generate the pulse signal in which the first-level period and a cycle of a pulse constituting of the first-level period and the second-level period are set based on individual data values; and a transmission unit configured to transmit the pulse signal generated by the modulation unit to the data carrier apparatus based on a potential difference provided between the two communication lines, and the data carrier apparatus comprises: a reception unit configured to receive the pulse signal from the data carrier driving apparatus; a measurement unit configured to measure a time width of the first-level period and the cycle of the pulse including the first-level period in the received pulse signal received by the reception unit; and a demodulation unit configured to demodulate data conveyed by the received pulse signal, by determining the data value corresponding to the first-level period based on a measured value of the first-level period output from the measurement unit and a first reference value, and determining the data value corresponding to the cycle based on a measured value of the cycle output from the measurement unit and a second reference value.

Further features of the present invention will become apparent from the following description of exemplary embodiments (with reference to the attached drawings).

BRIEF DESCRIPTION OF THE DRAWINGS

FIGS. 5A to 5D show examples of a pulse voltage Vab corresponding to command data.

FIG. 7 shows an example of time width measurement using an internal clock in a data carrier apparatus.

FIGS. 9A to 9D show examples of a pulse voltage Vab corresponding to command data.

DESCRIPTION OF THE EMBODIMENTS

Figure 1:
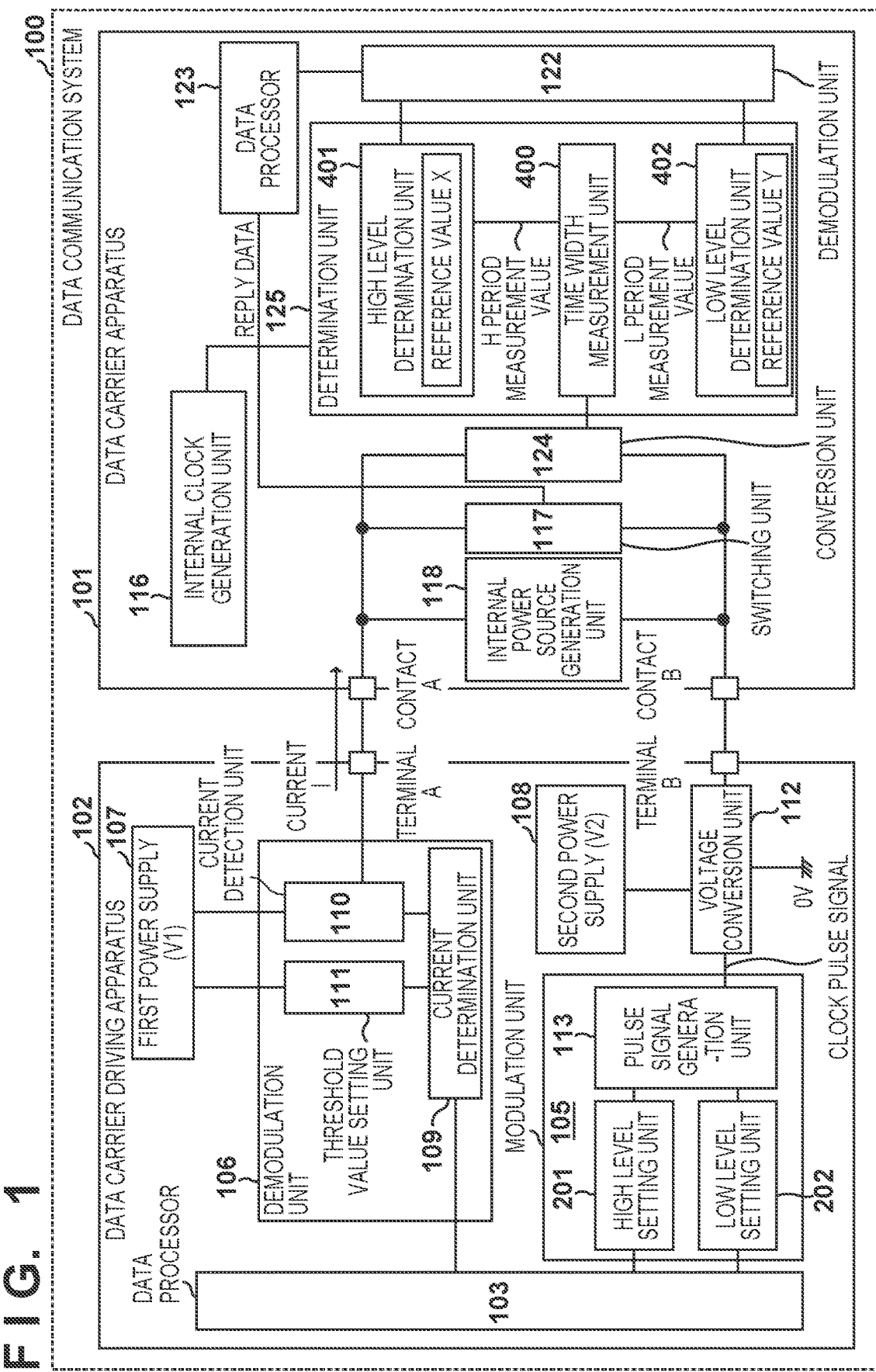
FIG. 1 shows a configuration example of a data communication system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

FIG. 1 shows a configuration example of a data communication system 100 according to a first embodiment of the present disclosure. The data communication system 100 includes a data carrier apparatus 101 and a data carrier driving apparatus 102. The data carrier driving apparatus 102 has a terminal A and a terminal B. The data carrier apparatus 101 has a contact A and a contact B. As shown in FIG. 1, the terminal A and the contact A are connected to each other by a communication line, and the terminal B and the contact B are connected to each other by a communication line, whereby the data carrier apparatus 101 and the data carrier driving apparatus 102 can communicate via these two communication lines. The data carrier apparatus 101 and the data carrier driving apparatus 102 transmit and receive data via two communication lines. The data carrier driving apparatus 102 further supplies power for operation of the data carrier apparatus 101 to the data carrier apparatus 101 via these two communication lines.

The data communication system 100 according to this embodiment is applicable to, for example, an image forming apparatus as exemplified in a later-described embodiment. Specifically, the data carrier driving apparatus 102 may be provided in the main body of the image forming apparatus, and the data carrier apparatus 101 may be provided in a replaceable unit that can be attached to the image forming apparatus. The image forming apparatus is configured such that when a replaceable unit is attached to the image forming apparatus, the data carrier driving apparatus 102 and the data carrier apparatus 101 are connected to each other by two communication lines and can communicate with each other. The data carrier apparatus 101 is provided with a memory (not shown) in which information is stored. The memory may store information related to the replaceable unit, such as information regarding authentication of the replaceable unit or information regarding control parameters in image formation control performed using the replaceable unit. The image forming apparatus can use the data communication system 100 to acquire information stored in the memory provided in the data carrier apparatus 101.

Figure 2:
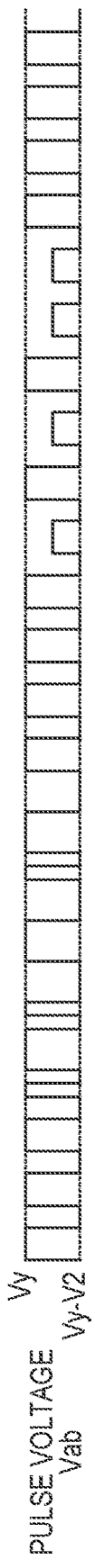
FIG. 2 shows an example of change in a communication state of the data communication system and a pulse voltage Vab corresponding to each communication state.

FIG. 2 shows an example of change in the communication state of the data communication system 100 and a pulse voltage Vab corresponding to each communication state. The data communication system 100 has four communication states (standby state, data transmission state, interval state, and data reply state). As shown in FIG. 2, the data communication system 100 performs data communication while changing communication states in the order of the standby state, the data transmission state, the interval state, and the data reply state.

In the data transmission state, the data carrier driving apparatus 102 transmits command data to the data carrier apparatus 101. For example, the data carrier driving apparatus 102 instructs the data carrier apparatus 101 to read out data stored in a memory (not shown) of the data carrier apparatus 101 using the command data. In the interval state, the data carrier apparatus 101 analyzes the command data received in the data transmission state, and it executes processing according to the command data. In the data reply state, the data carrier apparatus 101 transmits reply data to the data carrier driving apparatus 102 as a response to the command data received from the data carrier driving apparatus 102 in the data transmission state. For example, in a case where command data received in the data transmission state instructs readout of data stored in the memory, the data stored in the memory is transmitted as reply data. When the data reply state ends, the data communication system 100 transitions to the standby state. The standby state corresponds to a state before the data carrier driving apparatus 102 transmits the next command data to the data carrier apparatus 101.

Data Carrier Driving Apparatus 102

Figure 3:
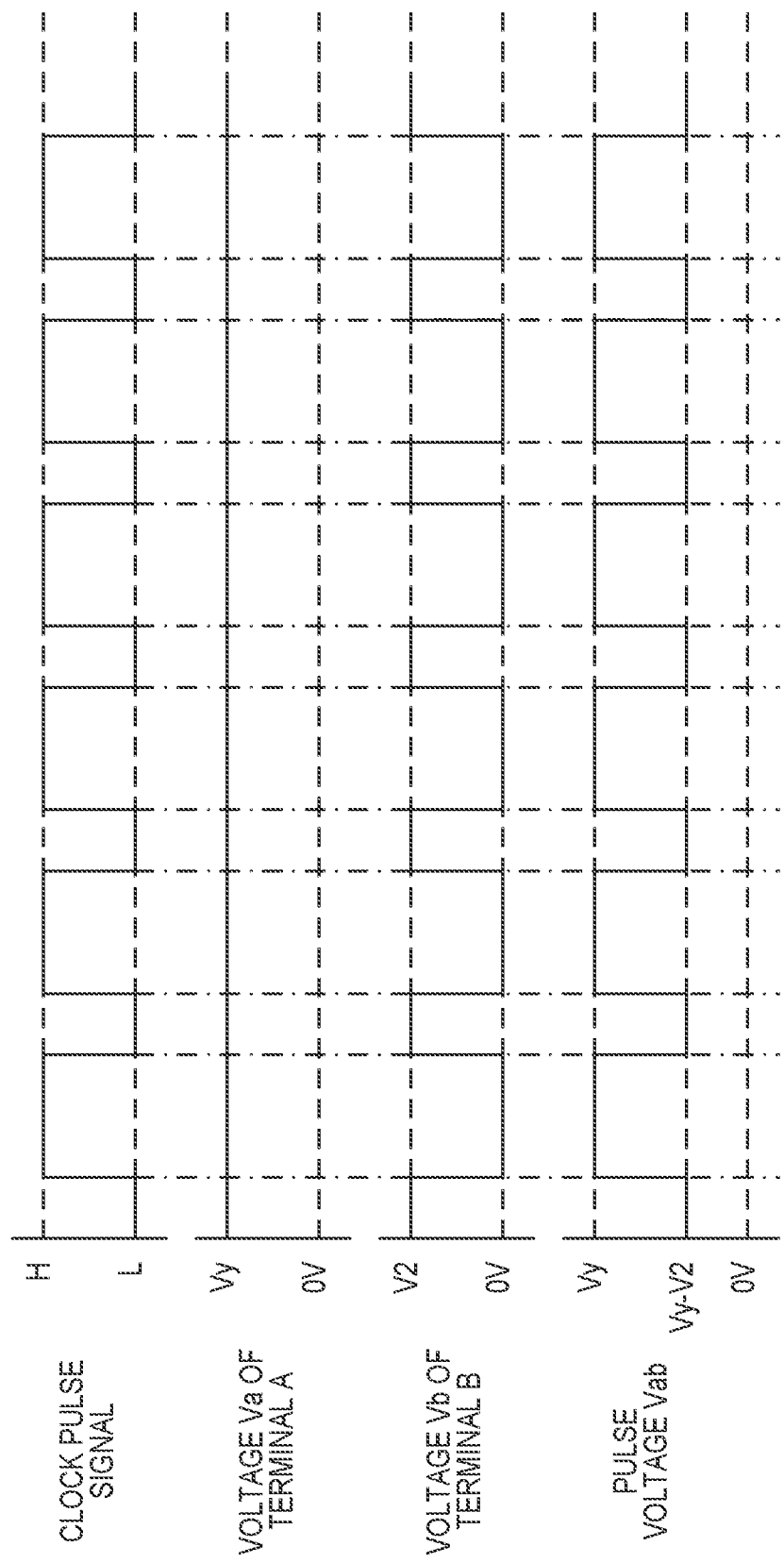
FIG. 3 shows an example of signal waveforms in a data communication system.
Figure 4:
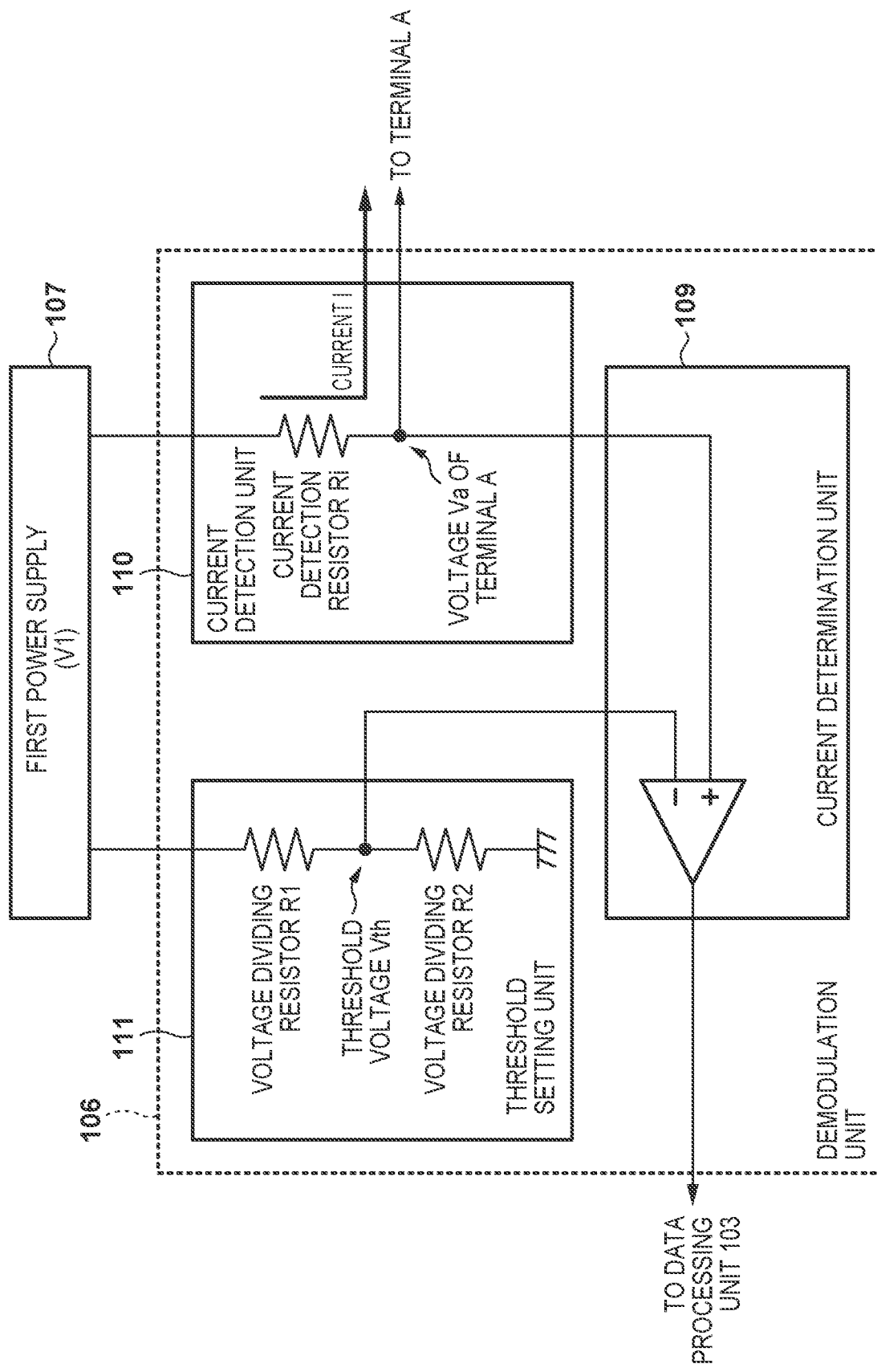
FIG. 4 shows an example of a configuration of a demodulation unit of a data carrier driving apparatus.

Next, the configuration and operation of the data carrier driving apparatus 102 will be described. FIG. 3 shows an example of a signal waveform in the data communication system 100. FIG. 4 shows a configuration example of a demodulation unit 106 of the data carrier driving apparatus 102.

As shown in FIG. 1, the data carrier driving apparatus 102 includes a first power supply 107 that outputs a voltage V1, and a second power supply 108 that outputs a voltage V2 lower than the voltage V1. The first power supply 107 outputs the voltage V1 to a current detection unit 110 and a threshold setting unit 111 of the demodulation unit 106. The second power supply 108 outputs the voltage V2 to a voltage conversion unit 112. A data processing unit 103 generates command data to be transmitted to the data carrier apparatus 101 and executes processing based on reply data received from the data carrier apparatus 101.

The modulation unit 105 includes a pulse signal generation unit 113, a high level setting unit 201, and a low level setting unit 202, and generates a pulse signal (clock pulse signal) according to the data to be transmitted (command data) generated by the data processing unit 103. In this embodiment, the high level setting unit 201 stores a high-level period A and a high-level period B, which are two setting values for the high-level (H-level) period of the pulse signal. The low level setting unit 202 stores a low-level period A and a low-level period B, which are two setting values for the low-level (L-level) period of the pulse signal.

The high level setting unit 201 and the low level setting unit 202 operate alternatingly. The high level setting unit 201 selects (sets) the high-level period A or the high-level period B according to the data value of the command data, and notifies the pulse signal generation unit 113 of the selection result. The low-level setting unit 202 selects (sets) the low-level period A or the low-level period B according to the data value of the command data, and notifies the pulse signal generation unit 113 of the selection result.

The pulse signal generation unit 113 generates a clock pulse signal including a pulse having the high-level period set by the high level setting unit 201 and the low-level period set by the low level setting unit 202, and outputs the generated clock pulse signal to the voltage conversion unit 112. That is, the pulse signal generation unit 113 of this embodiment outputs a clock pulse signal including any of the following four types of pulses.

A pulse with the high-level period A and the low-level period A

A pulse with the high-level period B and the low-level period A;

A pulse with the high-level period A and the low-level period B

A pulse with the high-level period B and the low-level period B

In this way, the modulation unit 105 generates a pulse signal that alternatingly repeats a high-level period (first level period) and a low-level period (second level period), and in which the high-level period and the low-level period are set based on separate data values.

The voltage conversion unit 112 outputs, to the terminal B, a voltage V2 output from the second power supply 108 during a period when the level of the input clock pulse signal is a low level (L level). On the other hand, the voltage conversion unit 112 outputs 0 V (GND) to the terminal B during a period when the level of the input clock pulse signal is a high level (H level). For example, when the clock pulse signal shown in FIG. 3 is input from the modulation unit 105 (pulse signal generation unit 113) to the voltage conversion unit 112, the voltage conversion unit 112 outputs a voltage Vb having the waveform shown in FIG. 3 to the terminal B. In this way, the voltage conversion unit 112 changes the potential difference (pulse voltage Vab) provided between the above-described two communication lines by changing the voltage Vb based on the clock pulse signal generated by the modulation unit 105. That is, the voltage conversion unit 112 is configured to transmit the clock pulse signal generated by the modulation unit 105 to the data carrier apparatus 101 based on the potential difference provided between the two communication lines.

The demodulation unit 106 includes a current determination unit 109, a current detection unit 110, and a threshold setting unit 111, demodulates the reply data transmitted from the data carrier apparatus 101 to the data carrier driving apparatus 102, and outputs the demodulation result to the data processing unit 103. As shown in FIG. 4, the current detection unit 110 includes a current detection resistor Ri. Due to a current I flowing from the first power supply 107 to the data carrier apparatus 101 via the current detection unit 110, a voltage drop occurs at the current detection resistor Ri of the current detection unit 110. A voltage Va at the contact A of the data carrier apparatus 101 (the terminal A of the data carrier driving apparatus 102) changes according to the voltage drop (=I×Ri) that occurs in the current detection resistor Ri due to the current I. For example, if the voltage Va is Vy in the case where the value of the current I is Iy, the voltage Va at the contact A (terminal A) of the data carrier apparatus 101 is $$Va = Vy = (V1 - Iy \times Ri)$$

The threshold setting unit 111 has voltage dividing resistors R1 and R2, and generates a threshold voltage Vth by dividing the voltage V1 output by the first power supply 107 using the voltage dividing resistors R1 and R2. The current determination unit 109 has a comparator to which the threshold voltage Vth and the voltage Va at the terminal A are input. The comparator determines the magnitude of the voltage drop that occurs in the current detection resistor Ri due to the current I by comparing the input voltages, and outputs the determination result to the data processing unit 103.

Note that, as will be described later, in this embodiment, it is the data carrier apparatus 101 that changes the value of the current I. Specifically, the data carrier apparatus 101 sets the value of current I to Iy in a communication state other than the data reply state. Also, in the data reply state, the data carrier apparatus 101 sets the value of the current I to Ix or Iy according to the data value of the reply data, and Ix is set to a value larger than Iy (i.e., Ix>Iy). In the following, the voltage Va is set as Vy in the case where the value of the current I is Iy, and the voltage Va is set as Vx in the case where the value of the current I is Ix. When Ix>Iy holds true, Vx<Vy holds true. Note that Vx>V2 holds true.

FIG. 3 shows, in addition to the waveform of the clock pulse signal output from the modulation unit 105, the waveforms of the voltage Vb at the terminal B, the voltage Va at the terminal A, and the pulse voltage Vab in the case where the value of the current I is Iy. The pulse voltage Vab is a potential difference between the terminal A and the terminal B, and is supplied to the data carrier apparatus 101 via the contact A and the contact B. In the example of FIG. 3, in a case where the value of the current I is Iy, the voltage Va at the terminal A is Vy. The voltage Vb at the terminal B changes between 0 V and V2 in response to the clock pulse signal, as described above. In this case, the waveform of the pulse voltage Vab is a pulse waveform that alternatingly repeats a high level and a low level, the high level being approximately Vy, and the low level being approximately (Vy−V2).

Transmission Processing Performed by Data Carrier Driving Apparatus

Next, command data transmission processing performed by the data carrier driving apparatus 102 will be described. When transmitting command data in the data transmission state, the modulation unit 105 of the data carrier driving apparatus 102 generates a clock pulse signal modulated according to the data value of the command data. As described above, the clock pulse signal output by the pulse signal generation unit 113 includes one of four types of pulses corresponding to the combination of the high-level period (high-level periods A and B) and the low-level period (low-level periods A and B). In the data transmission state, the data carrier driving apparatus 102 transmits command data by supplying the pulse voltage Vab corresponding to the clock pulse signal generated by the modulation unit 105 to the data carrier apparatus 101.

As described above, in this embodiment, the value of the current I is constant at Iy in a communication state other than the data reply state (i.e., the standby state, the data transmission state, and the interval state). For this reason, as shown in FIG. 3, in the data transmission state, the waveform of the pulse voltage Vab supplied to the data carrier apparatus 101 is a pulse waveform that alternatingly repeats a high level and a low level, similarly to the clock pulse signal generated by the modulation unit 105. Also, in a case where the clock pulse signal is at a high level, the pulse voltage Vab is the voltage Vy, and in a case where the clock pulse signal is at a low level, the pulse voltage Vab is a voltage (Vy−V2) lower than the voltage Vy.

FIG. 5A shows an example of the pulse voltage Vab corresponding to the command data in the case where the data carrier driving apparatus 102 transmits the command data including the data string "00100111" in the data transmission state. As shown in FIG. 5A, the data carrier driving apparatus 102 outputs to the data carrier apparatus 101 a pulse voltage Vab in which a high-level period and a low-level period are set according to respective individual data values. The pulse voltage Vab is applied between the contact A and the contact B of the data carrier apparatus 101.

In the example of FIG. 5A, regarding the high-level period, the bit value "0" is associated with the high-level period A, and the bit value "1" is associated with the high-level period B, which is longer (has a wider time width) than the high-level period A. Also, regarding the low-level period, the bit value "0" is associated with the low-level period A, and the bit value "1" is associated with the low-level period B, which is longer (has a wider time width) than the high-level period A. In this example, as shown in FIG. 5A, the high-level period A and the low-level period A have the same time width, and the high-level period B and the low-level period B have the same time width. The high-level period A and the high-level period B are examples of a first setting value and a second setting value associated with respective different bit values, and the low-level period A and the low-level period B are examples of a third setting value and a fourth setting value associated with respective different bit values.

Note that the data carrier driving apparatus 102 of this embodiment repeatedly outputs (transmits) a pulse having a predetermined high-level period and a predetermined low-level period in a communication state other than the data transmission state.

Data Carrier Apparatus 101

Next, the configuration and operation of the data carrier apparatus 101 will be described.

As shown in FIG. 1, the data carrier apparatus 101 includes an internal clock generation unit 116, a switching unit 117, an internal power source generation unit 118, a demodulation unit 122, a data processing unit 123, a conversion unit 124, and a determination unit 125. The internal power source generation unit 118 generates a voltage Vp to be used by the data carrier apparatus 101 based on the pulse voltage Vab supplied from the data carrier driving apparatus 102, and it supplies the voltage Vp to each unit of the data carrier apparatus 101. The conversion unit 124 converts the pulse voltage Vab into a voltage that can be used in logic units within the data carrier apparatus 101. The internal clock generation unit 116 generates an internal clock with a frequency higher than the frequency of the pulse voltage Vab and outputs the internal clock to the determination unit 125.

Reception Processing Performed by Data Carrier Apparatus 101

Figure 6:
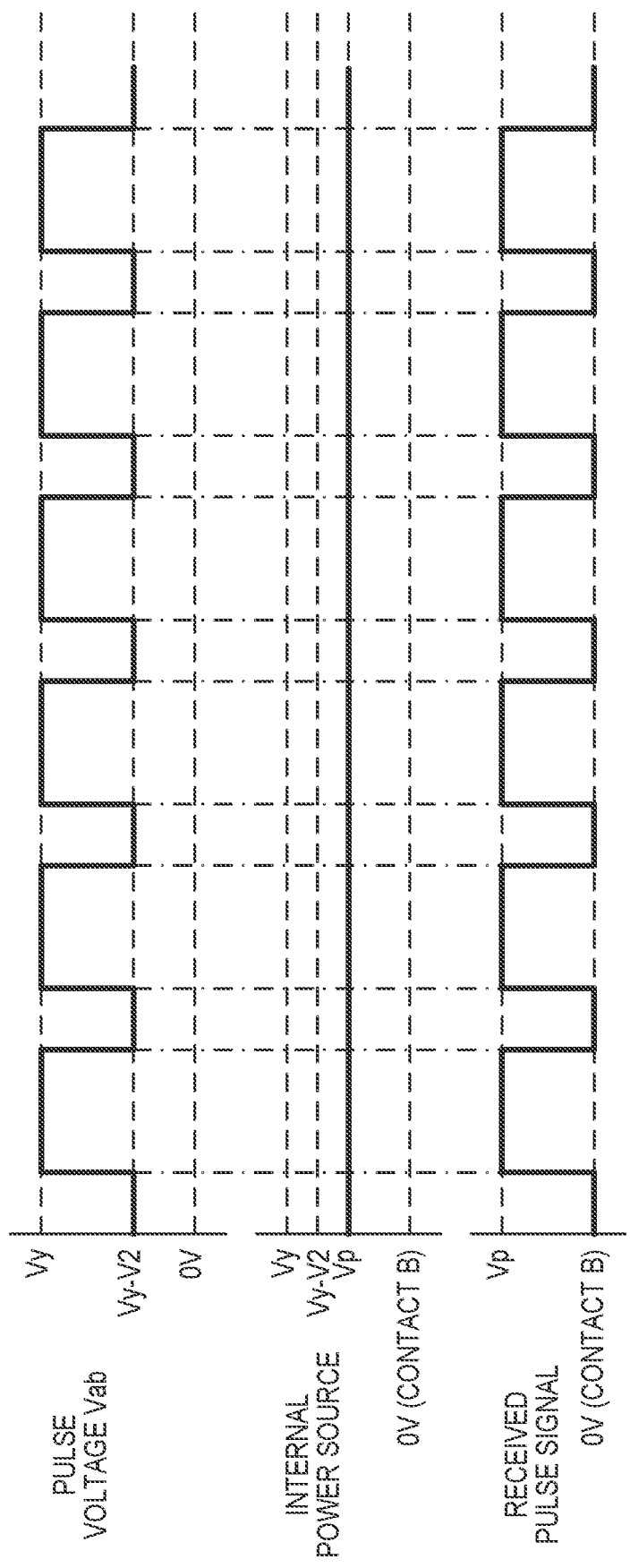
FIG. 6 shows an example of signal waveforms in a data carrier apparatus.

FIG. 6 shows the waveforms of the pulse voltage Vab, the voltage generated by the internal power source generation unit 118, and the received pulse signal output to the determination unit 125 in a case where the value of the current I is Iy. In this embodiment, the conversion unit 124 converts the pulse voltage Vab into the voltage Vp in a case where the pulse voltage Vab is at a high level, and it converts the pulse voltage Vab into a reference voltage that is lower than the voltage Vp in a case where the pulse voltage Vab is at a low level. The conversion unit 124 outputs the converted voltage to the determination unit 125 as a received pulse signal. Note that in this embodiment, the reference voltage of the data carrier apparatus 101 is set to the same potential as the contact B, and is expressed as 0 V.

In the data transmission state, the determination unit 125 measures the time width of the received pulse signal, performs determination based on the measurement result and the reference value, and outputs the determination result to the demodulation unit 122. In the configuration example of FIG. 1, the determination unit 125 includes a time width measurement unit 400, a high level determination unit 401, and a low level determination unit 402. A reference value X for determination is set in the high level determination unit 401, and a reference value Y for determination is set in the low level determination unit 402.

FIG. 7 shows an example of time width measurement using an internal clock. The time width measurement unit 400 uses the internal clock generated by the internal clock generation unit 116 to measure the time widths of the high-level period t1 and the low-level period t2 in the received pulse signal received by the conversion unit 124. The high-level period corresponds to the period from the rising edge to the falling edge of the received pulse signal. The low-level period corresponds to the period from the falling edge to the rising edge of the received pulse signal. As shown in FIG. 7, the time width measurement unit 400 acquires a measurement value as a count value obtained by counting the internal clock for the high-level period t1 and the low-level period t2 of the received pulse signal. The time width measurement unit 400 outputs the measured value of the period t1 to the high level determination unit 401 at the timing when the high-level period ends. Also, the time width measurement unit 400 outputs the measured value of the period t2 to the low level determination unit 402 at the timing when the low-level period ends.

The high level determination unit 401 compares the measured value of the period t1 and the reference value X, and outputs the result of determining whether the measured value is larger than the reference value X to the demodulation unit 122. The low level determination unit 402 compares the measured value of the period t2 and the reference value Y, and outputs the result of determining whether the measured value is larger than the reference value Y to the demodulation unit 122.

The demodulation unit 122 demodulates the data (command data) conveyed by the received pulse signal, based on the determination result output from the determination unit 125. Specifically, the demodulation unit 122 demodulates the command data in units of 1 bit each time a determination result is input from either the high level determination unit 401 or the low level determination unit 402.

The demodulation unit 122 determines the data value corresponding to the high-level period based on the result of determining whether the measured value of the high-level period in the received pulse signal is larger than the reference value X, which is output from the high level determination unit 401. When the pulse signal shown in FIG. 5A is received, the data value is determined to be "1" according to the determination result that the measured value of the high-level period is larger than the reference value X, and the data value is determined to be "0" according to the determination result that the measured value is not larger than the reference value X.

Also, the demodulation unit 122 determines the data value corresponding to the low-level period based on the result of determining whether or not the measured value of the low-level period in the received pulse signal is larger than the reference value Y, which is output from the low level determination unit 402. When the pulse signal shown in FIG. 5A is received, the data value is determined to be "1" according to the determination result that the measured value of the low-level period is larger than the reference value Y, and the data value is determined to be "0" according to the determination result that the measured value is not larger than the reference value Y. In this way, the demodulation unit 122 outputs the determined data value to the data processing unit 123 each time determination of the data value is performed in units of 1 bit for the high-level period and the low-level period of the received pulse signal. The data processing unit 123 generates reply data based on the content of the command data, and outputs the reply data to the switching unit 117.

In this way, in the present embodiment, the demodulation unit 122 determines the data value corresponding to the first-level period (high-level period) based on the determination result of the high level determination unit 401, and determines the data value corresponding to the second-level period (low-level period) based on the determination result of the low level determination unit 402. That is, the demodulation unit 122 is configured to demodulate the data conveyed by the received pulse signal by determining the data value corresponding to the first-level period based on the measured value of the first-level period and the first reference value (reference value X), and determining the data value corresponding to the second-level period based on the measured value of the second-level period and the second reference value.

Note that the demodulation unit 122 may sequentially determine the data value in units of 2 bits for each cycle of the received pulse signal and output the determined 2-bit data value to the data processing unit 123. FIG. 5B shows an example of demodulation in units of 2 bits performed by the demodulation unit 122. In this example, the demodulation unit 122 can demodulate and output the data value in units of 2 bits based on the determination result output from the high level determination unit 401 and the determination result output from the low level determination unit 402 for each cycle of the received pulse signal.

Transmission Processing in Data Carrier Apparatus 101

Next, reply data transmission processing performed by the data carrier apparatus 101 will be described. As described above, when the interval state ends after the data transmission state, the data communication system 100 transitions to the data reply state. In the data reply state, the data carrier apparatus 101 transmits the reply data by changing the magnitude of the current I flowing from the data carrier driving apparatus 102 to the data carrier apparatus 101 according to the reply data.

Specifically, the switching unit 117 of the data carrier apparatus 101 switches the magnitude of the current I by changing the load according to the reply data input from the data processing unit 123. For example, in a case where the data value of the reply data is "0", the switching unit 117 changes the load such that the value of the current I is Ix during the period when the pulse voltage Vab is at a high level. In this way, the switching unit 117 transmits the reply data to the data carrier driving apparatus 102 by changing the current I flowing from the data carrier driving apparatus 102 to the data carrier apparatus 101 according to the data value of the reply data.

Setting Reference Values X and Y

Next, an example of setting (calibration) of the reference value X and the reference value Y, which are used to determine the high-level period and the low-level period, respectively, in the data carrier apparatus 101, will be described. In the present embodiment, the determination unit 125 sets the reference value X based on the measured value of the high-level period in the pulse signal received from the data carrier driving apparatus 102 at a predetermined timing, and it sets the reference value Y based on the measured value of the low-level period.

Specifically, the data carrier driving apparatus 102 transmits a setting pulse signal for setting the reference values X and Y to the data carrier apparatus 101 during a standby state in which data is not transmitted to the data carrier apparatus 101. The setting pulse signal is configured as a pulse signal in which the high-level period is set to an intermediate value between the above-mentioned high-level period A and high-level period B, and the low-level period is set to an intermediate value between the above-mentioned low-level period A and low-level period B. In the data carrier apparatus 101, the time width measurement unit 400 measures the time width of the high-level period and the time width of the low-level period in the setting pulse signal received from the data carrier driving apparatus 102.

In this case, the determination unit 125 sets the measured value of the high-level period measured by the time width measurement unit 400 for the setting pulse signal as the reference value X, and sets the measured value of the low-level period as the reference value Y. In this way, a reference value X by which the high-level period A and the high-level period B can be distinguished from each other can be appropriately set for the high-level period of the received pulse signal, and a reference value Y by which the low-level period A and the low-level period B can be distinguished from each other can be appropriately set for the low-level period.

The data communication system 100 may be configured such that the reference values X and Y are set as follows. For example, if the data carrier apparatus 101 is configured to set the reference values X and Y in a standby state before starting the first data communication, the data carrier apparatus 101 can also set the reference values X and Y each time the standby state occurs. Also, in the standby state, the data carrier apparatus 101 may measure not only one pulse but multiple pulses in the received pulse signal and set the reference values X and Y based on the average value of the obtained measured values. In this case, the data carrier driving apparatus 102 may continue to transmit the setting pulse signal to the data carrier apparatus 101 during the standby state. Also, the data carrier driving apparatus 102 may transmit the setting pulse signal at a timing when data is not transmitted in a communication state other than the standby state. The data carrier apparatus 101 may also set the reference values X and Y based on the received pulse signal in accordance with such a timing.

The setting pulse signal may also be configured as pulse signals in which the high-level period (first-level period) is set to the above-mentioned high-level period A (first setting value), and the low-level period (second-level period) is set to the above-mentioned low-level period A (third setting value). In this case, in the data carrier apparatus 101, the determination unit 125 is configured to set the reference value X and the reference value Y through a predetermined calculation based on the reference value of the high-level period and the reference value of the low-level period, which are measured for the setting pulse signal. Also, the determination unit 125 may be configured to correct the reference value X and the reference value Y set previously based on the measured value of the high-level period and the measured value of the low-level period, which are measured for the setting pulse signal for setting the reference value X and the reference value Y.

In this embodiment, an example has been described in which the reference values X and Y are set based on the measurement results of the time width measurement unit 400 in the standby state, but the reference values X and Y that are set in advance and stored in a non-volatile memory (not shown) may also be used.

Modified Example of Communication Start Timing

In this embodiment, as shown in FIG. 5A, the start timing of communication (transmission of command data) in the data transmission state is set to the rising edge of the clock pulse signal and the received pulse signal. This start timing may be set in advance between the data carrier apparatus 101 and the data carrier driving apparatus 102, and may be set, for example, to the falling edges of the clock pulse signal and the received pulse signal.

FIG. 5C shows an example of the pulse voltage Vab corresponding to the command data in the case where the falling edges of the clock pulse signal and the received pulse signal are set as the start timing of communication. In this case, the data carrier driving apparatus 102 starts the operation from the low level setting unit 202 out of the high level setting unit 201 and the low level setting unit 202 when starting the generation of the clock pulse signal. This makes it possible to generate a clock pulse signal having a waveform as shown in FIG. 5C.

On the other hand, the data carrier apparatus 101 can demodulate the data conveyed by the received pulse signal by starting the determination performed by the low level determination unit 402 before the high level determination unit 401. In this way, even if the start timing of communication (transmission of command data) in the data transmission state is set to the falling edges of the clock pulse signal and reception pulse signal, it is possible to transmit and receive data in units of 1 bit.

In the data carrier apparatus 101, even if the pulse signal shown in FIG. 5C is received, the demodulation unit 122 may sequentially determine the data values in units of 2 bits for each cycle of the received pulse signal, and output the determined 2-bit data values to the data processing unit 123. FIG. 5D shows an example of demodulation in units of 2 bits by the demodulation unit 122. In this example, the demodulation unit 122 can perform demodulation and output of the data values in units of 2 bits based on the determination result output from the low level determination unit 402 and the determination result output from the high level determination unit 401 for each cycle of the received pulse signal.

As described above, the data carrier apparatus 101 of this embodiment is configured to be able to communicate with the data carrier driving apparatus 102 using a pulse signal that alternatingly repeats a high-level period (first-level period) and a low-level period (second-level period). The data carrier apparatus 101 receives from the data carrier driving apparatus 102 a pulse signal in which a high-level period and a low-level period are set based on individual data values. The time width measurement unit 400 measures the respective time widths of the high-level period and the low-level period in the received pulse signal. The determination unit 125 determines the data value corresponding to the high-level period based on the measured value of the high-level period and the reference value X, and determines the data value corresponding to the low-level period based on the measured value of the low-level period and the reference value Y. As a result, the demodulation unit 122 demodulates the data conveyed by the received pulse signal.

Specifically, the high level determination unit 401 determines whether or not the measured value of the high-level period is larger than the reference value X, and outputs the determination result to the demodulation unit 122. The low level determination unit 402 determines whether or not the measured value of the low-level period is larger than the reference value Y, and outputs the determination result to the demodulation unit 122. The demodulation unit 122 determines the data value corresponding to the high-level period based on the determination result of the high level determination unit 401, and it determines the data value corresponding to the low-level period based on the determination result of the low level determination unit 402.

In this way, according to the present embodiment, the data carrier apparatus 101 can separately determine the data value (1 bit) corresponding to the high-level period and the data value (1 bit) corresponding to the low-level period in the received pulse signal. For this reason, 2-bit data communication is possible for each cycle of the pulse signal, and data communication can also be performed in units of 1 bit using, for example, one of the high-level period and the low-level period. Thus, according to the present embodiment, in cases of transmitting and receiving data using pulse signals, it is also possible to transmit and receive data in units of 1 bit while increasing the communication rate. For example, even if the number of bits of the data to be transmitted is odd, there is no need to adjust the data to 2-bit data (for example, by adding 1 bit) and the minimum necessary data can be transmitted and received at a higher speed.

Second Embodiment

Next, a second embodiment of the present disclosure will be described. Note that for the sake of simplicity of description, description of parts common to the above-described first embodiment is omitted.

Figure 8A:
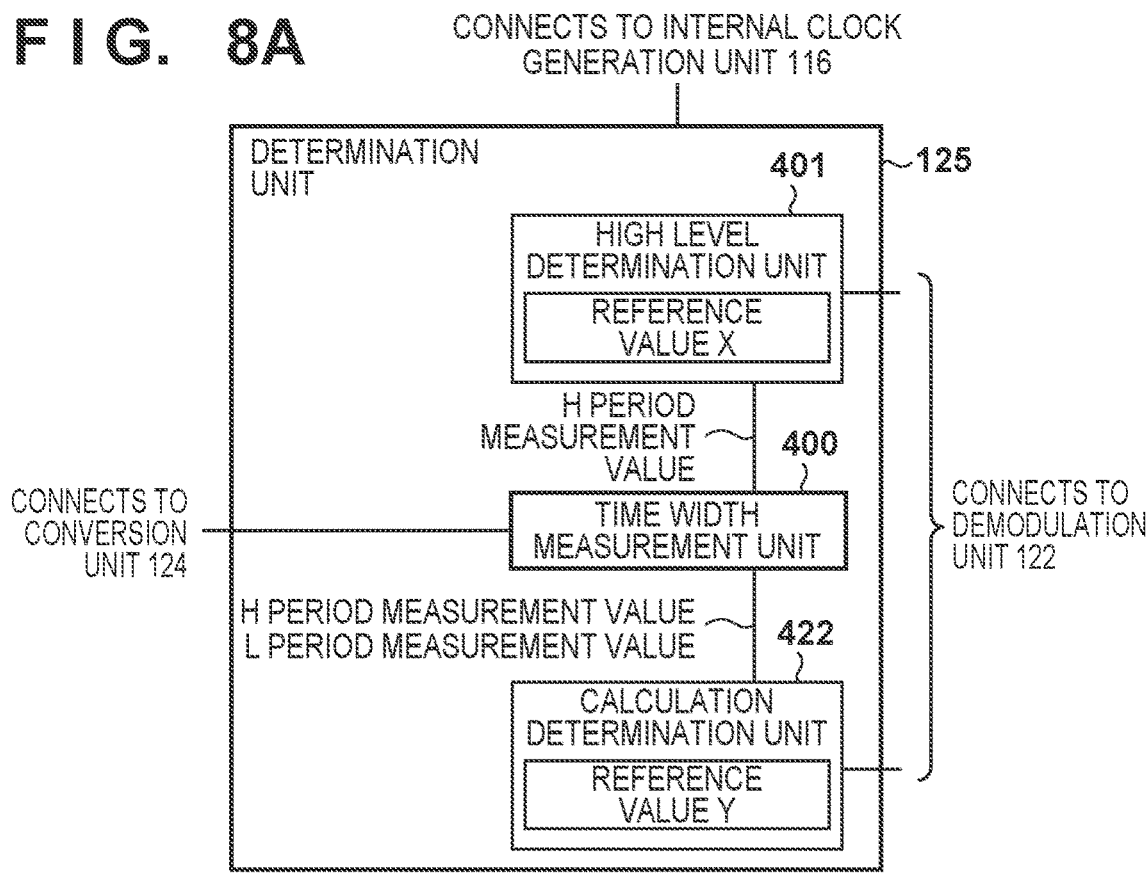
FIG. 8A shows a configuration example of a determination unit of a data carrier apparatus (second embodiment).

FIG. 8A shows a configuration example of the determination unit 125 of the data carrier apparatus 101 in the data communication system 100 according to the second embodiment. A data communication system 100 according to this embodiment has a configuration similar to that of the first embodiment (FIG. 1). However, the determination unit 125 of the data carrier apparatus 101 according to the present embodiment is configured to include a calculation determination unit 422 instead of the low level determination unit 402, as shown in FIG. 8A.

In the determination unit 125 of this embodiment, the time width measurement unit 400 outputs the measured value of the high-level period to the high level determination unit 401 at the timing when the high-level period (first-level period) in the received pulse signal ends, as in the first embodiment. Also, the time width measurement unit 400 outputs the measured value of the high-level period and the measured value of the low-level period to the calculation determination unit 422 at the timing when the low-level period (second-level period) ends.

The high level determination unit 401 compares the measured value of the high-level period of the received pulse signal output from time width measurement unit 400 with the reference value X, as in the first embodiment. The high level determination unit 401 outputs the result of determining whether or not the measured value is larger than the reference value X to the demodulation unit 122. On the other hand, the calculation determination unit 422 performs a predetermined calculation using the measured value of the high-level period and the measured value of the low-level period output from the time width measurement unit 400. In this embodiment, the predetermined calculation is a calculation for obtaining the sum of two measured values, and the calculated value that is obtained corresponds to the cycle of the received pulse signal. The calculation determination unit 422 further compares the calculated value obtained through the predetermined calculation with the reference value Y, and outputs the result of determining whether or not the calculated value is larger than the reference value Y to the demodulation unit 122.

The demodulation unit 122 demodulates the data (command data) conveyed by the received pulse signal, based on the determination result output from the determination unit 125. Specifically, the demodulation unit 122 demodulates the command data in units of 1 bit each time a determination result is input from either the high level determination unit 401 or the calculation determination unit 422.

FIG. 9A shows an example of the pulse voltage Vab corresponding to the command data in the case where the data carrier driving apparatus 102 transmits the command data including the data string "00100111" in the data transmission state. In the example of FIG. 9A, similarly to the example of FIG. 5A, regarding the high-level period, the bit value "0" is associated with the high-level period A, and the bit value "1" is associated with the high-level period B, which is longer (has a wider time width) than the high-level period A. Also, regarding the low-level period, the bit value "0" is associated with the low-level period A, and the bit value "1" is associated with the low-level period B, which is longer (has a wider time width) than the high-level period A. However, the high-level period A and the low-level period A are set to differ from each other and the high-level period B and the low-level period B are set to differ from each other such that the calculation determination unit 422 can determine the data value based on the calculation value indicating the cycle of the received pulse signal.

The demodulation unit 122 determines the data value corresponding to the high-level period based on the result of determining whether or not the measured value of the high-level period in the received pulse signal is larger than the reference value X, which is output from the high level determination unit 401. When the pulse signal shown in FIG. 9A is received, the data value is determined to be "1" according to the determination result that the measured value of the high-level period is larger than the reference value X, and the data value is determined to be "0" according to the determination result that the measured value is not larger than the reference value X.

Also, the demodulation unit 122 determines the data value corresponding to the low-level period based on the result of determining whether or not the calculation value indicating the cycle of the received pulse signal is larger than the reference value Y, which is output from the calculation determination unit 422. When the pulse signal shown in FIG. 9A is received, the data value is determined to be "1" according to the determination result that the calculated value is larger than the reference value Y, and the data value is determined to be "0" according to the determination result that the calculated value is not larger than the reference value Y.

In this way, the demodulation unit 122 outputs the determined data value to the data processing unit 123 each time the data values are determined in units of 1 bit for the high-level period and the cycle of the received pulse signal. When a pulse signal having the waveform shown in FIG. 9A is received, the data carrier apparatus 101 can demodulate the data string "00100111" through the above-described demodulation based on the determination result of the determination unit 125.

Note that, as in the first embodiment, the demodulation unit 122 may sequentially determine the data value in units of 2 bits for each cycle of the received pulse signal and output the determined 2-bit data value to the data processing unit 123. Also, in this embodiment, a case has been described in which the above-mentioned predetermined calculation is a calculation for obtaining the sum of two measured values, but the predetermined calculation may also be a calculation for obtaining the difference or ratio of two measured values. In the determination based on a calculated value indicating the difference between the two measured values, the data value may be determined based on whether or not the calculated value is 0 or more. Also, in the determination based on a calculated value indicating the ratio of two measured values, the data value may be determined based on whether or not the calculated value is 1 or more.

Setting Reference Values X and Y

In the present embodiment, the reference values X and Y can be set through the same method using the same setting pulse signal as in the first embodiment. However, regarding the reference value Y, the determination unit 125 of the data carrier apparatus 101 sets the calculated value obtained through the predetermined calculation as the reference value Y based on the measured value of the high-level period and the measured value of the low-level period in the standby state. For example, if the predetermined calculation is a calculation for obtaining the sum of two measured values, the sum of the measured value of the high-level period and the measured value of the low-level period is set as the reference value Y.

Also, as in the first embodiment, the setting pulse signal may be configured as a pulse signal in which the high-level period is set to the high-level period A and the low-level period is set to the low-level period A. In this case, similarly to the first embodiment, the determination unit 125 is configured to set the reference value X and the reference value Y through the predetermined calculation based on the measured value of the high-level period and the measured value of the low-level period, which are measured for the setting pulse signal. Also, the determination unit 125 may be configured to correct the reference value X and the reference value Y set previously, based on the measured value of the high-level period and the measured value of the low-level period, which are measured for the setting pulse signal for setting the reference value X and the reference value Y.

Modified Example of Communication Start Timing

In this embodiment, as shown in FIG. 9A, the start timing of communication (transmission of command data) in the data transmission state is set to the rising edges of the clock pulse signal and the received pulse signal. Similarly to the first embodiment, this start timing may be set in advance between the data carrier apparatus 101 and the data carrier driving apparatus 102, and for example, it may be set to the falling edges of the clock pulse signal and the received pulse signal.

FIG. 9B shows an example of the pulse voltage Vab corresponding to the command data in a state where the falling edges of the clock pulse signal and the received pulse signal are set as the communication start timing. In this case, the data carrier driving apparatus 102 starts the operation from the low level setting unit 202 out of the high level setting unit 201 and the low level setting unit 202 when starting the generation of the clock pulse signal. This makes it possible to generate a clock pulse signal having a waveform as shown in FIG. 9B. On the other hand, in the data carrier apparatus 101, the determination unit 125 is configured to have a low level determination unit 402 instead of the high level determination unit 401, and can demodulate the data conveyed by the received pulse signal by starting the determination from the low level determination unit 402.

As described above, in this embodiment, the high level determination unit 401 determines whether or not the measured value of the high-level period (first-level period) is larger than the reference value X, and outputs the determination result to the demodulation unit 122. The calculation determination unit 422 determines whether or not the calculated value obtained through the predetermined calculation using the measured value of the high-level period and the measured value of the low-level period (second-level period) is larger than the reference value Y, and outputs the determination result to the demodulation unit 122. The demodulation unit 122 determines the data value corresponding to the high-level period based on the determination result of the high level determination unit 401, and determines the data value corresponding to the low-level period based on the determination result of the calculation determination unit 422.

According to this embodiment, the data value (1 bit) corresponding to the high-level period in the received pulse signal and the data value (1 bit) corresponding to the low-level period can be determined individually by using the measured value of the high-level period and the calculated value obtained based on the measured values of the high-level period and the low-level period. As a result, in cases of transmitting and receiving data using pulse signals, it is possible to transmit and receive data in units of one bit while increasing the communication rate.

Third Embodiment

Next, a third embodiment of the present disclosure will be described. Note that for the sake of simplicity of description, description of parts common to the above-described first embodiment is omitted.

Figure 10:
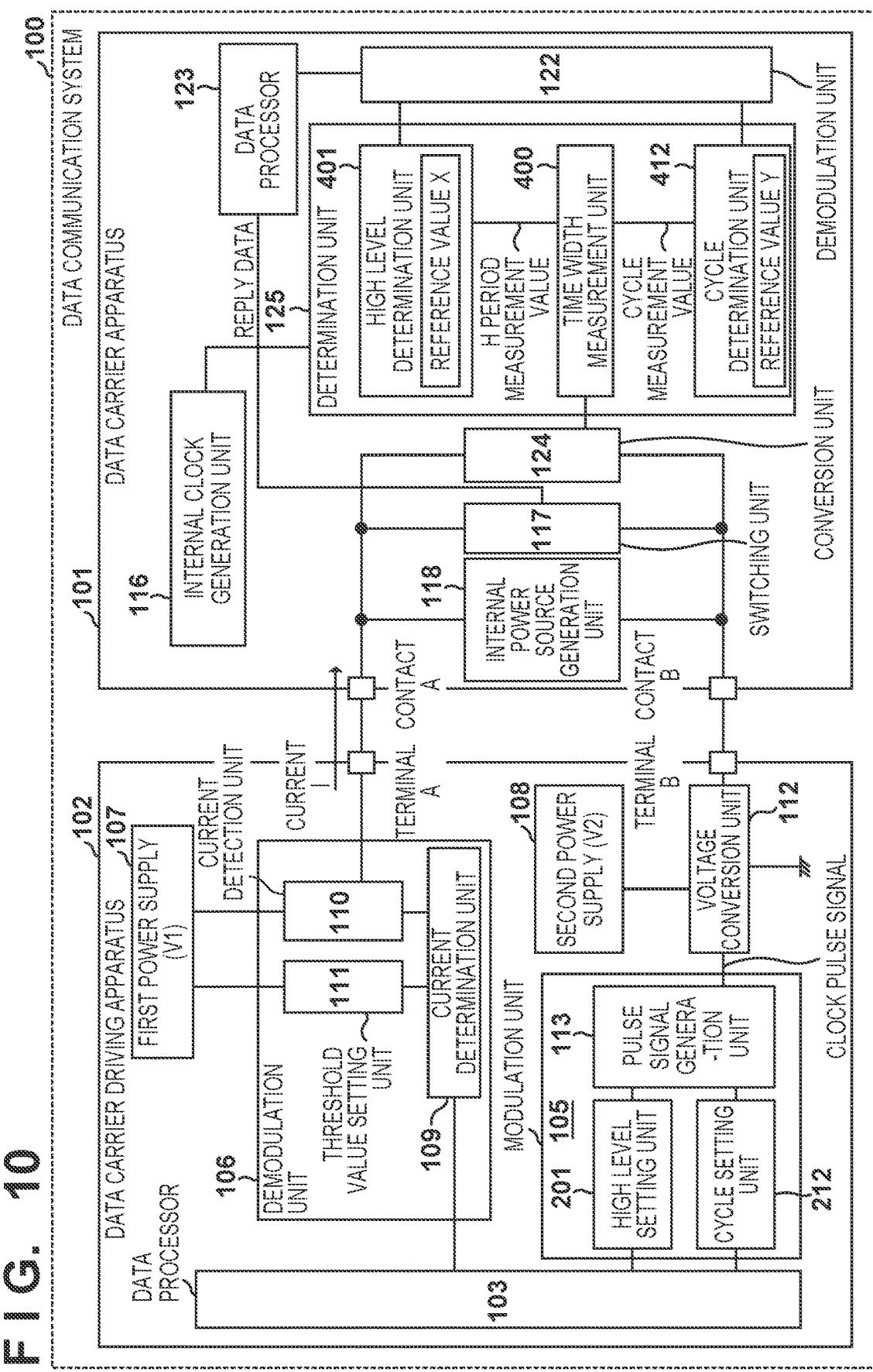
FIG. 10 shows a configuration example of a data communication system (third and fourth embodiments).

FIG. 10 shows a configuration example of a data communication system 100 according to the third embodiment. The data communication system 100 according to this embodiment has a configuration similar to that of the first embodiment (FIG. 1). However, in this embodiment, the modulation unit 105 of the data carrier driving apparatus 102 is configured to include a cycle setting unit 212 instead of the low level setting unit 202. Also, the determination unit 125 of the data carrier apparatus 101 is configured to include a cycle determination unit 412 instead of the low level determination unit 402.

In this embodiment, the high level setting unit 201 stores a high-level period A and a high-level period B, which are two setting values for the high-level (H-level) period of the pulse signal. The cycle setting unit 212 stores a cycle A and a cycle B, which are two setting values for the cycle of each pulse included in the pulse signal.

In the data carrier driving apparatus 102, the high level setting unit 201 selects (sets) the high-level period A or the high-level period B according to the data value of the command data, and notifies the pulse signal generation unit 113 of the selection result. The cycle setting unit 212 selects (sets) the cycle A or the cycle B according to the data value of the command data, and notifies the pulse signal generation unit 113 of the selection result. The pulse signal generation unit 113 generates a clock pulse signal including a pulse having a high-level period set by the high level setting unit 201 and including pulses having a cycle set by the cycle setting unit 212, and outputs the generated clock pulse signal to the voltage conversion unit 112.

In the data carrier apparatus 101, a reference value X for determination is set in the high level determination unit 401, and a reference value Y for determination is set in the cycle determination unit 412. The time width measurement unit 400 uses the internal clock generated by the internal clock generation unit 116 to measure the time width of the high-level period in the received pulse signal received by the conversion unit 124, and the cycle of the pulses including the high-level period.

Similarly to the first embodiment, the high level determination unit 401 compares the high-level measured value and the reference value X, and outputs the result of determining whether or not the measured value is larger than the reference value X to the demodulation unit 122. On the other hand, the cycle determination unit 412 compares the measured value of the cycle with the reference value Y, and outputs the result of determining whether or not the measured value is larger than the reference value Y to the demodulation unit 122.

Figure 9C:
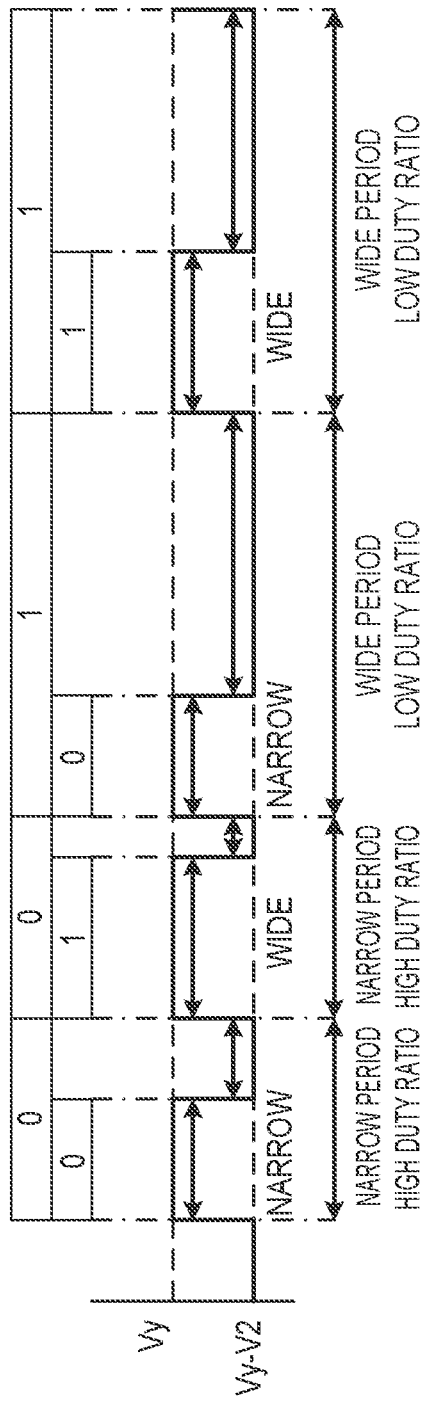

FIG. 9C shows an example of the pulse voltage Vab corresponding to the command data in the case where the data carrier driving apparatus 102 transmits the command data including the data string "00100111" in the data transmission state. In the example of FIG. 9C, as with the examples of FIGS. 5A and 9A, regarding the high-level period, the bit value "0" is associated with the high-level period A, and the bit value "1" is associated with the high-level period B, which is longer (has a wider time width) than the high-level period A. Regarding the cycle of the pulse, a bit value "0" is associated with the cycle A, and a bit value "1" is associated with the cycle B that is longer (has a wider time width) than the cycle A.

The demodulation unit 122 demodulates the data (command data) conveyed by the received pulse signal, based on the determination result output from the determination unit 125. Specifically, the demodulation unit 122 demodulates the command data in units of one bit each time a determination result is input from either the high level determination unit 401 or the cycle determination unit 412.

The demodulation unit 122 determines the data value corresponding to the high-level period based on the result of determining whether or not the measured value of the high-level period in the received pulse signal is larger than the reference value X, which is output from the high level determination unit 401. When the pulse signal shown in FIG. 9C is received, the data value is determined to be "1" according to the determination result that the measured value of the high-level period is larger than the reference value X, and the data value is determined to be "0" according to the determination result that the measured value is not larger than the reference value X.

Also, the demodulation unit 122 determines the data value corresponding to the period based on the result of determining whether or not the measured value of the cycle of the pulse in the received pulse signal is larger than the reference value Y, which is output from the cycle determination unit 412. When the pulse signal shown in FIG. 9C is received, the data value is determined to be "1" according to the determination result that the measured value of the cycle is larger than the reference value Y, and the data value is determined to be "0" according to the determination result that the measured value is not larger than the reference value Y.

In this way, the demodulation unit 122 outputs the determined data value to the data processing unit 123 each time the data values are determined in units of 1 bit for the high-level period and the cycle in the received pulse signal. When the pulse signal having the waveform shown in FIG. 9C is received, the data carrier apparatus 101 can demodulate the data string "00100111" through the above-described demodulation based on the determination result of the determination unit 125.

Note that, similarly to the first and second embodiments, the demodulation unit 122 may sequentially determine the data values in units of 2 bits for each cycle of the received pulse signal, and output the determined 2-bit data values to the data processing unit 123.

Setting Reference Values X and Y

In the present embodiment, the reference values X and Y can be set through the same method using the same setting pulse signal as in the first embodiment. In the present embodiment, the determination unit 125 sets the reference value X based on the measured value of the high-level period in the pulse signal received from the data carrier driving apparatus 102 at a predetermined timing, and sets the reference value Y based on the measured value of the cycle of the pulse.

Specifically, the data carrier driving apparatus 102 transmits a setting pulse signal for setting the reference values X and Y to the data carrier apparatus 101 during a standby state in which data is not transmitted to the data carrier apparatus 101. The setting pulse signal is configured as a pulse signal in which the high-level period is set to an intermediate value between the high-level period A and the high-level period B, and the cycle is set to an intermediate value between the cycle A and the cycle B. In the data carrier apparatus 101, the time width measurement unit 400 measures the time width of the high-level period and the cycle of the pulse including the high-level period in the setting pulse signal received from the data carrier driving apparatus 102.

In this case, the determination unit 125 sets the measured value of the high-level period measured by the time width measurement unit 400 for the setting pulse signal as the reference value X, and sets the measured value of the cycle as the reference value Y. In this way, for the high-level period of the received pulse signal, the reference value X by which the high-level period A and the high-level period B can be distinguished from each other, and for the period, the reference value Y by which the cycle A and the cycle B can be distinguished from each other can be set appropriately.

The setting pulse signal may be configured as a pulse signal in which the high-level period (first-level period) is set to the high-level period A (first setting value) and the cycle of the pulse is set to the cycle A (third setting value). In this case, in the data carrier apparatus 101, the determination unit 125 is configured to set the reference value X and the reference value Y through the predetermined calculation, based on the measured value of the high-level period and the measured value of the cycle, which are measured for the setting pulse signal. Also, the determination unit 125 may be configured to correct the reference value X and the reference value Y set previously, based on the measured value of the high-level period and the measured value of the cycle, which are measured for the setting pulse signal for setting the reference value X and the reference value Y.

In this embodiment, an example has been described in which the reference values X and Y are set based on the measurement results of the time width measurement unit 400 in the standby state, but the reference values X and Y that are set in advance and stored in a non-volatile memory (not shown) may also be used.

Modified Example of Communication Start Timing

In this embodiment, as shown in FIG. 9C, the start timing of communication (transmission of command data) in the data transmission state is set to the rising edges of the clock pulse signal and the received pulse signal. Similarly to the first and second embodiments, this start timing may be set in advance between the data carrier apparatus 101 and the data carrier driving apparatus 102, and for example, may be set to the falling edges of the clock pulse signal and the received pulse signal.

Figure 9D:
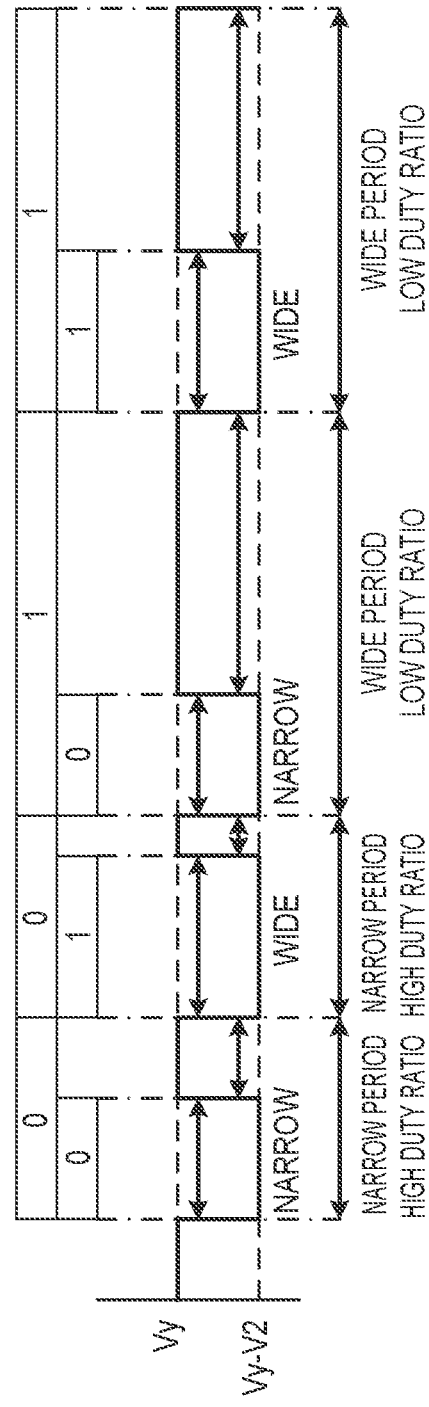

FIG. 9D shows an example of the pulse voltage Vab corresponding to the command data in the case where the falling edges of the clock pulse signal and the received pulse signal are set as the communication start timing. In this case, the data carrier driving apparatus 102 is configured to have a low level setting unit 202 instead of the high level setting unit 201. As a result, it is possible to generate a clock pulse signal having a waveform as shown in FIG. 9D. On the other hand, in the data carrier apparatus 101, the determination unit 125 is configured to have a low level determination unit 402 instead of the high level determination unit 401, and can demodulate the data conveyed by the received pulse signal by starting the determination from the low level determination unit 402.

As described above, the data carrier apparatus 101 of this embodiment is configured to be able to communicate with the data carrier driving apparatus 102 using a pulse signal that alternatingly repeats a high-level period (first-level period) and a low-level period (second-level period). The data carrier apparatus 101 receives from the data carrier driving apparatus 102 a pulse signal in which a high-level period and a cycle of a pulse consisting of a high-level period and a low-level period are set based on individual data values. The time width measurement unit 400 measures the time width of the high-level period and the cycle of a pulse including the high-level period in the received pulse signal. The determination unit 125 determines the data value corresponding to the high-level period based on the measured value of the high-level period and the reference value X, and determines the data value corresponding to the cycle based on the measured value of the cycle and the reference value Y. As a result, the demodulation unit 122 demodulates the data conveyed by the received pulse signal.

Specifically, the high level determination unit 401 determines whether or not the measured value of the high-level period is larger than the reference value X, and outputs the determination result to the demodulation unit 122. The cycle determination unit 412 determines whether or not the measured value of the cycle is larger than the reference value Y, and outputs the determination result to the demodulation unit 122. The demodulation unit 122 determines the data value corresponding to the high-level period based on the determination result of the high level determination unit 401, and determines the data value corresponding to the cycle based on the determination result of the cycle determination unit 412.

As described above, according to the present embodiment, the data carrier apparatus 101 can individually determine the data value (1 bit) corresponding to the high-level period and the data value (1 bit) corresponding to the cycle in the received pulse signal. For this reason, 2-bit data communication is possible for each cycle of the pulse signal, and data communication can also be performed in units of 1 bit using, for example, only the high-level period. Thus, according to the present embodiment, in cases of transmitting and receiving data using pulse signals, it is also possible to transmit and receive data in units of 1 bit while increasing the communication rate. For example, even if the number of bits of the data to be transmitted is odd, there is no need to adjust the data to 2-bit data (for example, by adding 1 bit) and transmit the adjusted data, and the minimum necessary data can be transmitted and received at a higher speed.

Fourth Embodiment

Next, a fourth embodiment of the present disclosure will be described. Note that for the sake of simplicity of description, description of parts common to the third embodiment described above is omitted.

Figure 8B:
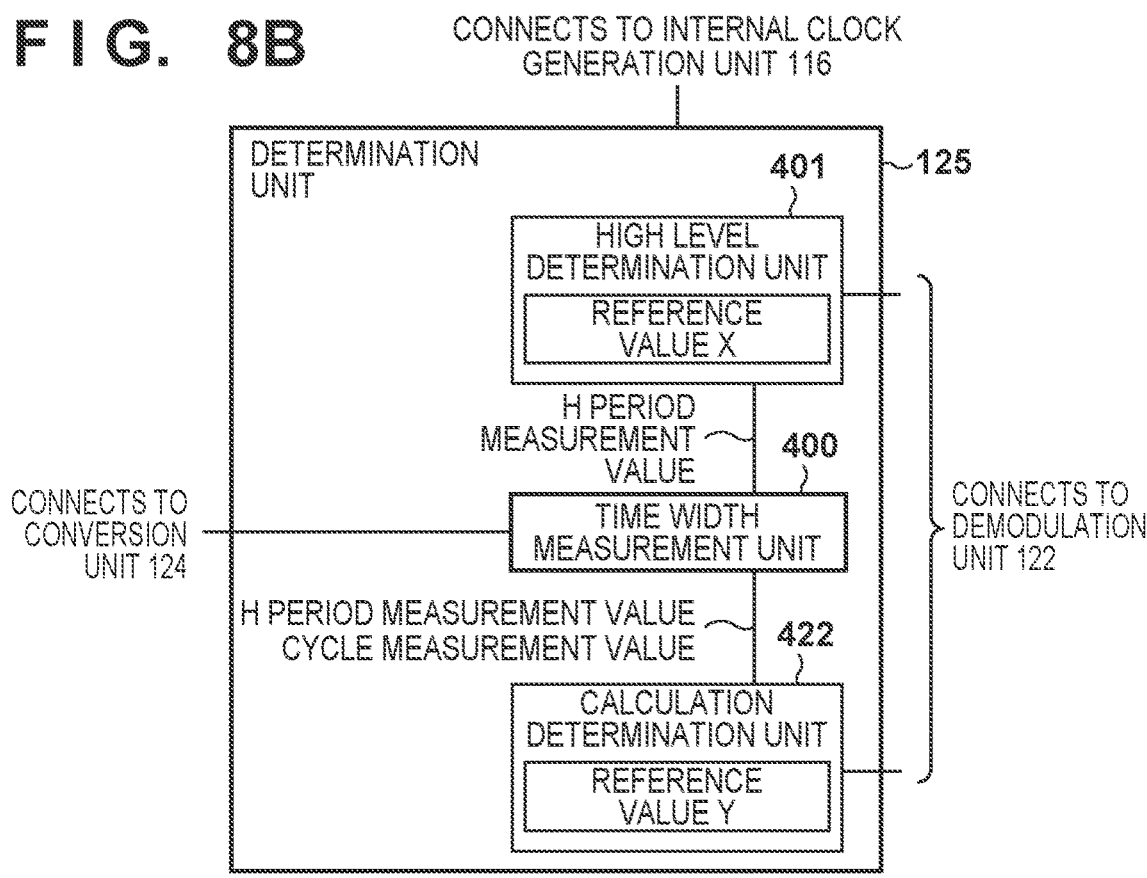
FIG. 8B shows a configuration example of a determination unit of a data carrier apparatus (fourth embodiment).

FIG. 8B shows a configuration example of the determination unit 125 of the data carrier apparatus 101 in the data communication system 100 according to the fourth embodiment. The data communication system 100 according to this embodiment has a configuration similar to the configuration in the third embodiment (FIG. 10). However, the determination unit 125 of the data carrier apparatus 101 according to the present embodiment is configured to include a calculation determination unit 422 instead of the cycle determination unit 412, as shown in FIG. 8B.

In the determination unit 125 of the present embodiment, the time width measurement unit 400 outputs the measured value of the high-level period to the high level determination unit 401, as in the third embodiment. Also, the time width measurement unit 400 outputs the measured value of the high-level period and the measured value of the cycle to the calculation determination unit 422.

The high level determination unit 401 compares the measured value of the high-level period of the received pulse signal output from time width measurement unit 400 with the reference value X, as in the third embodiment. The high level determination unit 401 outputs the result of determining whether or not the measured value is larger than the reference value X to the demodulation unit 122. On the other hand, the calculation determination unit 422 performs a predetermined calculation using the measured value of the high-level period and the measured value of the cycle output from the time width measurement unit 400. In this embodiment, the predetermined calculation is a calculation for obtaining the difference between two measured values, and the calculated value that is obtained corresponds to the time width of the low-level period of the received pulse signal. The calculation determination unit 422 further compares the calculated value obtained through the predetermined calculation with the reference value Y, and outputs the result of determining whether or not the calculated value is larger than the reference value Y to the demodulation unit 122.

The demodulation unit 122 demodulates the data (command data) conveyed by the received pulse signal, based on the determination result output from the determination unit 125. Specifically, the demodulation unit 122 demodulates the command data in units of 1 bit each time a determination result is input from either the high level determination unit 401 or the calculation determination unit 422.

The demodulation unit 122 determines the data value corresponding to the high-level period based on the result of determining whether or not the measured value of the high-level period in the received pulse signal is larger than the reference value X, which is output from the high level determination unit 401. When the pulse signal shown in FIG. 9C is received, the data value is determined to be "1" according to the determination result that the measured value of the high-level period is larger than the reference value X, and the data value is determined to be "0" according to the determination result that the measured value is not larger than the reference value X.

Also, the demodulation unit 122 determines the data value corresponding to the cycle, based on the result of determining whether or not the calculated value indicating the time width of the low-level period of the received pulse signal is larger than the reference value Y, which is output from the calculation determination unit 422. When the pulse signal shown in FIG. 9C is received, the data value is determined to be "1" according to the determination result that the calculated value is larger than the reference value Y, and the data value is determined to be "0" according to the determination result that the calculated value is not larger than the reference value Y.

In this way, the demodulation unit 122 outputs the determined data value to the data processing unit 123 each time the data value is sequentially determined in units of 1 bit for the high-level period and the low-level period of the received pulse signal. When the pulse signal having the waveform shown in FIG. 9C is received, the data carrier apparatus 101 can demodulate the data string "00100111"

through the above-described demodulation based on the determination result of the determination unit 125.

Note that, as in the third embodiment, the demodulation unit 122 may sequentially determine the data value in units of 2 bits for each cycle of the received pulse signal, and output the determined 2-bit data values to the data processor 123. Also, in this embodiment, a case has been described in which the above-described predetermined calculation is a calculation for obtaining the difference between two measured values, but the predetermined calculation may also be a calculation for obtaining the ratio of two measured values. In the determination based on the calculated value indicating the ratio of two measured values, the data value may be determined based on whether or not the calculated value is 1 or more.

Setting Reference Values X and Y

In this embodiment, the reference values X and Y can be set in the same manner as in the third embodiment using the same setting pulse signal. However, regarding the reference value Y, the determination unit 125 of the data carrier apparatus 101 sets the calculated value obtained through the predetermined calculation as the reference value Y, based on the measured value of the high-level period in the standby state and the measured value of the cycle. For example, if the predetermined calculation is a calculation for obtaining the difference between two measured values, the difference between the measured value of the high-level period and the measured value of the cycle is set as the reference value Y. Also, as in the third embodiment, the setting pulse signal may be configured as a pulse signal in which the high-level period (first-level period) is set to the high-level period A (first setting value) and the cycle of the pulse is set to the cycle A (third setting value). In this case, similarly to the third embodiment, the determination unit 125 is configured to set the reference value X and the reference value Y through the predetermined calculation, based on the measured value of the high-level period and the measured value of the cycle, which are measured for the setting pulse signal. Also, the determination unit 125 may be configured to correct the reference value X and the reference value Y set previously, based on the measured value of the high-level period and the measured value of the cycle, which are measured for the setting pulse signals for the reference value X and the reference value Y.

Modified Example of Communication Start Timing

In this embodiment, as in the first to third embodiments, the start timing of communication (transmission of command data) in the data transmission state is set to the rising edges of the clock pulse signal and the received pulse signal. As in the first to third embodiments, this start timing may be determined in advance between the data carrier apparatus 101 and the data carrier driving apparatus 102, and for example, may be set to the falling edges of the clock pulse signal and the received pulse signal.

As described above, in this embodiment, the high level determination unit 401 determines whether or not the measured value of the high-level period (first-level period) is larger than the reference value X, and outputs the determination result to the demodulation unit 122. The calculation determination unit 422 determines whether or not the calculated value obtained through the predetermined calculation using the measured value of the high-level period and the measured value of the cycle is larger than the reference value Y, and outputs the determination result to the demodulation unit 122. The demodulation unit 122 determines the data value corresponding to the high-level period based on the determination result of the high level determination unit 401, and determines the data value corresponding to the cycle based on the determination result of the calculation determination unit 422.

According to this embodiment, the data value (1 bit) corresponding to the high-level period in the received pulse signal and the data value (1 bit) corresponding to the cycle are individually determined using the measured value of the high-level period and the calculated value obtained based on the measured values of the high-level period and the cycle. As a result, when transmitting and receiving data using pulse signals, it is possible to transmit and receive data in units of 1 bit while increasing the communication rate.

OTHER EMBODIMENTS

The data communication systems 100 of the embodiments described above are applicable to, for example, an image forming apparatus. In that case, a configuration may be applied in which the data carrier driving apparatus 102 is mounted on the main body side of the image forming apparatus, and the data carrier apparatus 101 is mounted on a replaceable component such as a consumable item. Hereinafter, a configuration example of an image forming apparatus to which the data communication systems of the first and second embodiments described above are applied will be described.

Figure 11:
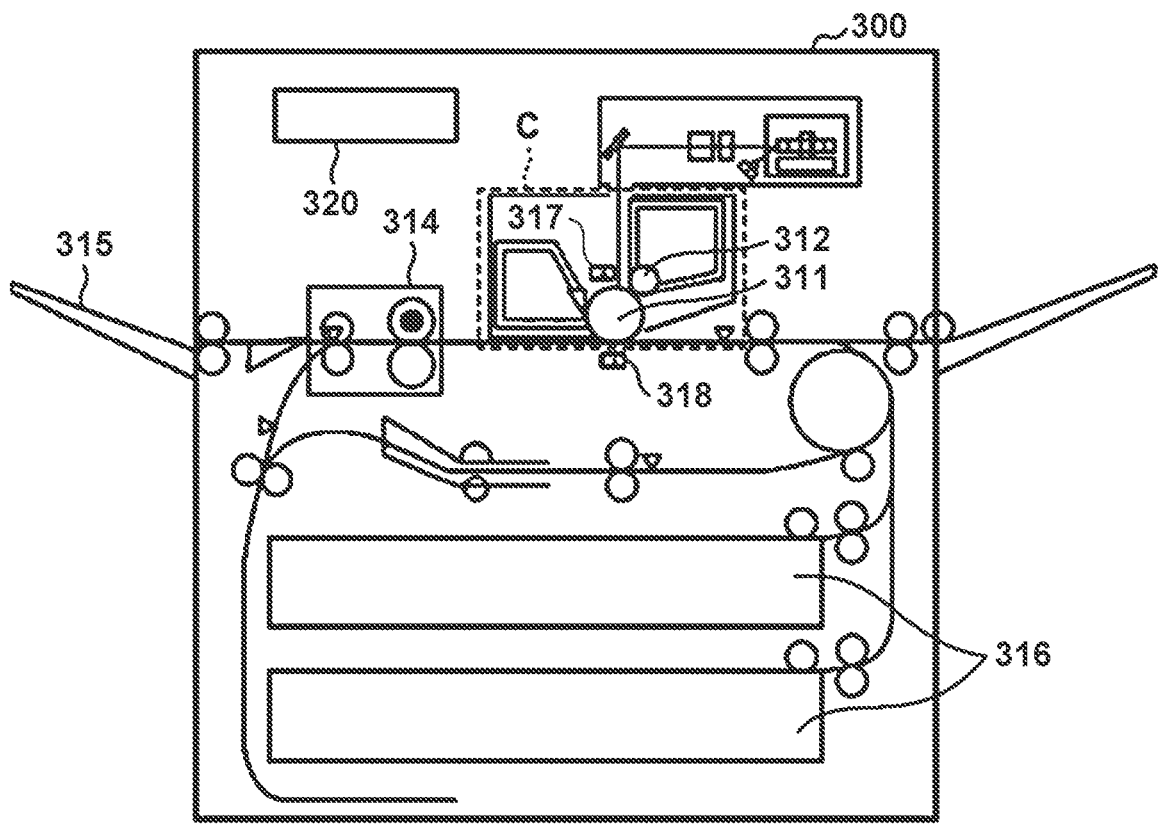
FIG. 11 is a cross-sectional view showing a schematic configuration example of a printer.

FIG. 11 is a cross-sectional view showing a schematic configuration example of a printer 300 as an example of the image forming apparatus of this embodiment. The printer 300 is configured as an electrophotographic laser beam printer. The printer 300 includes a photosensitive drum 311, a charging unit 317, and a developing unit 312, as an image forming unit. The photosensitive drum 311 is an example of an image carrier on which an electrostatic latent image is formed. The charging unit 317 uniformly charges the photosensitive drum 311. The developing unit 312 forms a toner image on the photosensitive drum 311 by developing the electrostatic latent image formed on the photosensitive drum 311 with toner. The photosensitive drum 311, the charging unit 317, and the developing unit 312 can be attached to and detached from the main body of the image forming apparatus as an integrated cartridge C. A fixing device 314 fixes the toner image transferred to a sheet onto the sheet. The sheet that has passed through the fixing device 314 is discharged onto a tray 315.

The printer 300 further includes a controller 320 including a CPU for controlling the image forming operations described above. The controller 320 includes a memory (ROM, RAM, etc.) that stores programs for controlling the operations of the printer 300 and data used to execute the programs.

Figure 12:
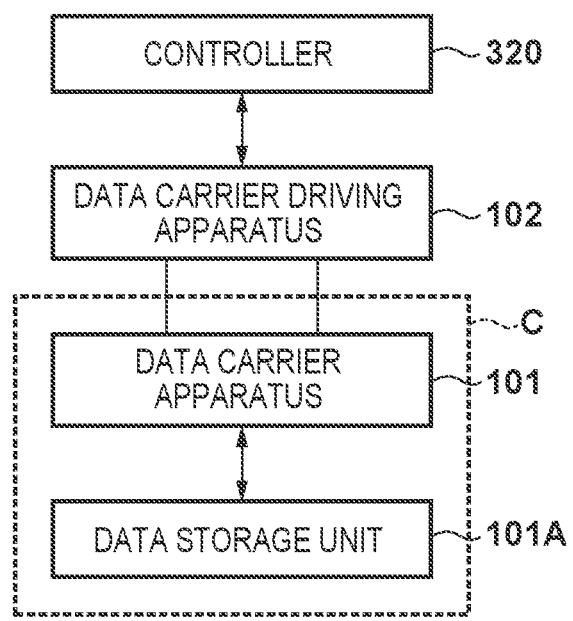
FIG. 12 is a block diagram showing an example of a control configuration of a printer.

FIG. 12 is a block diagram showing an example of a control configuration in the case where a data communication system is applied to the printer 300. The main body of the printer 300 includes a data carrier driving apparatus 102 that can communicate bidirectionally with the controller 320. The cartridge C includes a data carrier apparatus 101 and a data storage unit 101A. The data carrier apparatus 101 controls the readout and writing of data in the data storage unit 101A. As the data storage unit 101A, a nonvolatile memory such as an EEPROM can be used.

The data carrier driving apparatus 102 executes data communication with the data carrier apparatus 101 mounted on the cartridge C based on commands from the controller 320. The data carrier apparatus 101 of the cartridge C can, for example, process data transmitted from the data carrier driving apparatus 102 and store the processed data in the data storage unit 101A. Also, the data carrier apparatus 101 can read out data stored in the data storage unit 101A based on a signal from the data carrier driving apparatus 102, and transmit the data as reply data to the data carrier driving apparatus 102.

In this way, the above-described embodiments are applicable to a data communication system in which the data carrier apparatus 101 is mounted as a replaceable component (replaceable unit) of an image forming apparatus (printer 300). By storing data regarding a cartridge serving as a consumable of the image forming apparatus in the data storage unit 101A, it is possible to provide a system for managing, for example, the usage status of the cartridge, such as the remaining amount of toner and the usage amount of the photosensitive drum.

Note that the above-described embodiment is not limited to the image forming apparatus (printer 300) illustrated in FIG. 11, but is also applicable to, for example, a color image forming apparatus including a plurality of image forming units. Also, the replaceable component (replaceable unit) on which the data carrier apparatus 101 is provided is not limited to a cartridge. For example, it is possible to provide a data communication system by providing the data carrier apparatus 101 in various replaceable components, including process members used for image formation, such as an intermediate transfer belt unit including an intermediate transfer belt to which the toner image on the photosensitive drum 311 is transferred, or a toner unit containing toner.

According to the present disclosure, in cases of transmitting and receiving data using a pulse signal, it is possible to transmit and receive data even in units of 1 bit while increasing the communication rate.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-208797, filed Dec. 26, 2022, which is hereby incorporated by reference herein in its entirety.

What is claimed is:

1. A data carrier apparatus capable of communicating with a data carrier driving apparatus, comprising:
    a reception unit configured to receive, from the data carrier driving apparatus, a pulse signal that alternatingly repeats a first-level period and a second-level period, and in which the first-level period and the second-level period are set based on individual data values;
    a measurement unit configured to measure respective time widths of the first-level period and the second-level period in the received pulse signal received by the reception unit; and
    a demodulation unit configured to demodulate data conveyed by the received pulse signal, by determining the data value corresponding to the first-level period based on a measured value of the first-level period output from the measurement unit and a first reference value, and determining the data value corresponding to the second-level period based on a measured value of the second-level period output from the measurement unit and a second reference value.

2. The data carrier apparatus according to claim 1, further comprising:
    a first determination unit configured to determine whether or not the measured value of the first-level period is larger than the first reference value; and
    a second determination unit configured to determine whether or not the measured value of the second-level period is larger than the second reference value,
    wherein the demodulation unit determines the data value corresponding to the first-level period based on the determination result of the first determination unit and determines the data value corresponding to the second-level period based on the determination result of the second determination unit.

3. The data carrier apparatus according to claim 1, further comprising:
    a first determination unit configured to determine whether or not the measured value of the first-level period is larger than the first reference value; and
    a second determination unit configured to determine whether or not a calculated value obtained through a predetermined calculation using the measured value of the first-level period and the measured value of the second-level period is larger than the second reference value,
    wherein the demodulation unit determines the data value corresponding to the first-level period based on the determination result of the first determination unit and determines the data value corresponding to the second-level period based on the determination result of the second determination unit.

4. The data carrier apparatus according to claim 3, wherein the calculated value is a sum, a difference, or a ratio of the measured value of the first-level period and the measured value of the second-level period.

5. The data carrier apparatus according to claim 1, further comprising
    a setting unit configured to set the first reference value and the second reference value based on a setting pulse signal for setting the first reference value and the second reference value, which is transmitted from the data carrier driving apparatus and received by the reception unit while the data carrier driving apparatus is not transmitting data.

6. The data carrier apparatus according to claim 5, wherein the setting pulse signal is a pulse signal in which the first-level period is set to an intermediate value between a first setting value and a second setting value for the first-level period, which are associated with respective different bit values, and the second-level period is set to an intermediate value between a third setting value and a fourth setting value for the second-level period, which are associated with respective different bit values.

7. The data carrier apparatus according to claim 6, wherein the setting unit sets the measured value of the first-level period and the measured value of the second-level period, which are measured by the measurement unit for the setting pulse signal, as the first reference value and the second reference value, respectively.

8. The data carrier apparatus according to claim 5, wherein a pulse signal conveying data is a pulse signal in which the first-level period is set to a first setting value or a second setting value, which are associated with respective different bit values, and the second-level period is set to a third setting value or a fourth setting value, which are associated with respective different bit values,
the setting pulse signal is a pulse signal in which the first-level period is set to the first setting value and the second-level period is set to the third setting value, and
the setting unit sets the first reference value and the second reference value through a predetermined calculation based on the measured value of the first-level period and the measured value of the second-level period, which are measured by the measurement unit for the setting pulse signal.

9. The data carrier apparatus according to claim 5, wherein the setting unit corrects the first reference value and the second reference value set previously, based on the setting pulse signal for setting the first reference value and the second reference value.

10. The data carrier apparatus according to claim 1, wherein the data carrier apparatus is connected to the data carrier driving apparatus by two communication lines, and receives the pulse signal from the data carrier driving apparatus based on a potential difference provided by the data carrier driving apparatus between the two communication lines.

11. A data carrier apparatus capable of communicating with a data carrier driving apparatus, comprising:
a reception unit configured to receive, from the data carrier driving apparatus, a pulse signal that alternatingly repeats a first-level period and a second-level period, and in which the first-level period and a cycle of a pulse consisting of the first-level period and the second-level period are set based on individual data values;
a measurement unit configured to measure a time width of the first-level period and the cycle of the pulse including the first-level period in the received pulse signal received by the reception unit; and
a demodulation unit configured to demodulate data conveyed by the received pulse signal, by determining the data value corresponding to the first-level period based on a measured value of the first-level period output from the measurement unit and a first reference value, and determining the data value corresponding to the cycle based on a measured value of the cycle output from the measurement unit and a second reference value.

12. The data carrier apparatus according to claim 11, further comprising:
a first determination unit configured to determine whether or not the measured value of the first-level period is larger than the first reference value; and
a second determination unit configured to determine whether or not the measured value of the cycle is larger than the second reference value,
wherein the demodulation unit determines the data value corresponding to the first-level period based on the determination result of the first determination unit and determines the data value corresponding to the cycle based on the determination result of the second determination unit.

13. The data carrier apparatus according to claim 11, further comprising:
a first determination unit configured to determine whether or not the measured value of the first-level period is larger than the first reference value; and
a second determination unit configured to determine whether or not a calculated value obtained through a predetermined calculation using the measured value of the first-level period and the measured value of the cycle is larger than the second reference value,
wherein the demodulation unit determines the data value corresponding to the first-level period based on the determination result of the first determination unit and determines the data value corresponding to the cycle based on the determination result of the second determination unit.

14. The data carrier apparatus according to claim 13, wherein the calculated value is a sum, a difference, or a ratio of the measured value of the first-level period and the measured value of the cycle.

15. The data carrier apparatus according to claim 11, further comprising
a setting unit configured to set the first reference value and the second reference value based on a setting pulse signal for setting the first reference value and the second reference value, which is transmitted from the data carrier driving apparatus and received by the reception unit while the data carrier driving apparatus is not transmitting data.

16. The data carrier apparatus according to claim 15, wherein the setting pulse signal is a pulse signal in which the first-level period is set to an intermediate value between a first setting value and a second setting value for the first-level period, which are associated with respective different bit values, and the cycle is set to an intermediate value between a third setting value and a fourth setting value for the cycle, which are associated with respective different bit values.

17. The data carrier apparatus according to claim 16, wherein the setting unit sets the measured value of the first-level period and the measured value of the cycle, which are measured by the measurement unit for the setting pulse signal, as the first reference value and the second reference value, respectively.

18. The data carrier apparatus according to claim 15, wherein a pulse signal conveying data is a pulse signal in which the first-level period is set to a first setting value or a second setting value, which are associated with respective different bit values, and the cycle is set to a third setting value or a fourth setting value, which are associated with respective different bit values, the setting pulse signal is a pulse signal in which the first-level period is set to the first setting value and the cycle is set to the third setting value, and the setting unit sets the first reference value and the second reference value through a predetermined calculation based on the measured value of the first-level period and the measured value of the cycle, which are measured by the measurement unit for the setting pulse signal.

19. The data carrier apparatus according to claim 15, wherein the setting unit corrects the first reference value and the second reference value set previously, based on the setting pulse signal for setting the first reference value and the second reference value.

20. The data carrier apparatus according to claim 11, wherein the data carrier apparatus is connected to the data carrier driving apparatus by two communication lines, and receives the pulse signal from the data carrier driving apparatus based on a potential difference provided by the data carrier driving apparatus between the two communication lines.

21. A replaceable unit that is attachable to an image forming apparatus, comprising:
a process member to be used for image formation; and
a data carrier apparatus capable of communicating with a data carrier driving apparatus provided in the image forming apparatus, when attached to the image forming apparatus,
wherein the data carrier apparatus comprises:
a reception unit configured to receive, from the data carrier driving apparatus, a pulse signal that alternatingly repeats a first-level period and a second-level period, and in which the first-level period and the second-level period are set based on individual data values;
a measurement unit configured to measure respective time widths of the first-level period and the second-level period in the received pulse signal received by the reception unit; and
a demodulation unit configured to demodulate data conveyed by the received pulse signal, by determining the data value corresponding to the first-level period based on a measured value of the first-level period output from the measurement unit and a first reference value, and determining the data value corresponding to the second-level period based on a measured value of the second-level period output from the measurement unit and a second reference value.

22. A communication system comprising: a data carrier apparatus; and a data carrier driving apparatus to be connected to the data carrier apparatus by two communication lines,
wherein the data carrier driving apparatus comprises:
a modulation unit configured to generate a pulse signal that alternatingly repeats a first-level period and a second-level period, and that is modulated based on data to be transmitted, the modulation unit being configured to generate the pulse signal in which the first-level period and the second-level period are set based on individual data values; and
a transmission unit configured to transmit the pulse signal generated by the modulation unit to the data carrier apparatus based on a potential difference provided between the two communication lines, and
the data carrier apparatus comprises:
a reception unit configured to receive the pulse signal from the data carrier driving apparatus;
a measurement unit configured to measure respective time widths of the first-level period and the second-level period in the received pulse signal received by the reception unit; and
a demodulation unit configured to demodulate data conveyed by the received pulse signal, by determining the data value corresponding to the first-level period based on a measured value of the first-level period output from the measurement unit and a first reference value, and determining the data value corresponding to the second-level period based on a measured value of the second-level period output from the measurement unit and a second reference value.

23. The communication system according to claim 22, wherein the data carrier driving apparatus is provided in a main body of an image forming apparatus, and
the data carrier apparatus is provided in a replaceable unit of the image forming apparatus.

24. A communication system comprising: a data carrier apparatus; and a data carrier driving apparatus to be connected to the data carrier apparatus by two communication lines,
wherein the data carrier driving apparatus comprises:
a modulation unit configured to generate a pulse signal that alternatingly repeats a first-level period and a second-level period, and that is modulated based on data to be transmitted, the modulation unit being configured to generate the pulse signal in which the first-level period and a cycle of a pulse constituting of the first-level period and the second-level period are set based on individual data values; and
a transmission unit configured to transmit the pulse signal generated by the modulation unit to the data carrier apparatus based on a potential difference provided between the two communication lines, and
the data carrier apparatus comprises:
a reception unit configured to receive the pulse signal from the data carrier driving apparatus;
a measurement unit configured to measure a time width of the first-level period and the cycle of the pulse including the first-level period in the received pulse signal received by the reception unit; and
a demodulation unit configured to demodulate data conveyed by the received pulse signal, by determining the data value corresponding to the first-level period based on a measured value of the first-level period output from the measurement unit and a first reference value, and determining the data value corresponding to the cycle based on a measured value of the cycle output from the measurement unit and a second reference value.

* * * * *